(12) United States Patent
Moore et al.

(10) Patent No.: US 10,643,429 B2
(45) Date of Patent: May 5, 2020

(54) IDENTIFYING A SPECIALLY DESIGNATED OBJECT TO FACILIATE DYNAMIC PROMOTIONS RELATED TO USE OF THE OBJECT

(71) Applicant: Walker Digital Table Systems, LLC, Las Vegas, NV (US)

(72) Inventors: Stephen Moore, Las Vegas, NV (US); Michael Russell, Las Vegas, NV (US); Mark Hettinger, Henderson, NV (US)

(73) Assignee: Walker Digital Table Systems, LLC, Las Vegas, NV (US)

( * ) Notice: Subject to any disclaimer, the term of this patent is extended or adjusted under 35 U.S.C. 154(b) by 0 days.

(21) Appl. No.: 15/859,328

(22) Filed: Dec. 30, 2017

(65) Prior Publication Data

US 2018/0122187 A1     May 3, 2018

Related U.S. Application Data

(63) Continuation of application No. PCT/US2016/044939, filed on Jul. 31, 2016.
(Continued)

(51) Int. Cl.
*A63F 1/18* (2006.01)
*G07F 17/32* (2006.01)
(Continued)

(52) U.S. Cl.
CPC ............ *G07F 17/3248* (2013.01); *A63F 1/18* (2013.01); *G06K 7/10009* (2013.01);
(Continued)

(58) Field of Classification Search
CPC ............... G07F 17/3248; G07F 17/322; G07F 17/3225; G07F 17/3293; A63F 1/18;
(Continued)

(56) References Cited

U.S. PATENT DOCUMENTS 6,517,436 B2 *   2/2003   Soltys ................ G06Q 10/0639
                                                      463/29
7,661,592 B1 *   2/2010   Chisholm .......... G06K 7/10722
                                                      235/454

(Continued)

*Primary Examiner* — Allen Chan
(74) *Attorney, Agent, or Firm* — Fincham Downs LLC; Magdalena M. Fincham

(57) ABSTRACT

In accordance with some embodiments, a physical game element such as a wagering chip or a playing card may be utilized to implement a promotion scheme on an electronic card table (e.g., using RFID or optical imaging technology). During a game it may be determined whether the element is associated with special functionality (e.g., entitles the player to a payout multiplier, special payout table, bonus prize or other benefit). The special functionality may have been previously associated with the element or associated with the element during the game (e.g., dynamically and/or randomly). In accordance with some embodiments a player is not able to readily discern the special functionality by a physical inspection of the physical game element and is only notified of the special functionality once the physical game element is used in a qualifying action (e.g., during a wager at an electronic card table).

22 Claims, 10 Drawing Sheets

Related U.S. Application Data

(60) Provisional application No. 62/314,370, filed on Mar. 28, 2016, provisional application No. 62/199,797, filed on Jul. 31, 2015.

(51) Int. Cl.
*G06K 19/07* (2006.01)
*G06K 7/10* (2006.01)
*G07C 15/00* (2006.01)
*G06F 7/58* (2006.01)
*G06Q 50/34* (2012.01)

(52) U.S. Cl.
CPC ....... *G06K 19/0723* (2013.01); *G07C 15/006* (2013.01); *G07F 17/322* (2013.01); *G07F 17/3225* (2013.01); *G07F 17/3293* (2013.01); *G06F 7/582* (2013.01); *G06K 7/10297* (2013.01); *G06K 7/10366* (2013.01); *G06K 7/10762* (2013.01); *G06Q 50/34* (2013.01)

(58) Field of Classification Search
CPC .......... G06K 7/10009; G06K 7/10297; G06K 7/10366; G06K 7/10762; G06K 19/0723; G07C 15/006; G06Q 50/34; G06F 7/582
USPC .......................................................... 463/11
See application file for complete search history.

(56) References Cited

U.S. PATENT DOCUMENTS

| | | | |
|---|---|---|---|
| 2008/0176642 A1* | 7/2008 | Phillips | A44C 21/00 463/25 |
| 2010/0285869 A1* | 11/2010 | Walker | G07F 17/32 463/25 |
| 2011/0028204 A1* | 2/2011 | Schwartz | G07F 1/06 463/25 |

* cited by examiner

| Chip Set ID 602 | Chip ID 604 | Chip Denom 606 | Chip Status 608 | Associated Player ID 610 |
|---|---|---|---|---|
| C01-32715 | CH-001 | 10 | Active | P-0013578 |
| C01-32715 | CH-002 | 10 | Active | P-0032199 |
| C01-32715 | CH-003 | 10 | House | n/a |
| C01-32715 | CH-004 | 25 | House | n/a |
| C01-32715 | CH-005 | 25 | Active | P-0024523 |
| C01-32715 | CH-006 | 25 | Inactive | n/a |

FIG. 6

(12)  United States Patent

IDENTIFYING A SPECIALLY DESIGNATED OBJECT TO FACILIATE DYNAMIC PROMOTIONS RELATED TO USE OF THE OBJECT

CLAIM OF PRIORITY

This application is a Continuation Application of PCT Application PCT/US2016/044939, filed on Jul. 31, 2016 in the name of Stephen Moore. This PCT application claims the benefit of (i) U.S. Provisional Application No. 62/199,797 filed Jul. 31, 2015 in the name of Moore et al., titled SYSTEMS AND METHODS FOR UTILIZING RFID TECHNOLOGY TO IDENTIFY A SPECIALLY DESIGNATED OBJECT AT A LOCATION AND INDICATE THE RECOGNITION TO A USER AT THE LOCATION; and (ii) U.S. Provisional Application No. 62/314,370 filed Mar. 28, 2016 in the name of Moore et al., titled SYSTEMS AND METHODS FOR UTILIZING RFID TECHNOLOGY TO IDENTIFY A SPECIALLY DESIGNATED OBJECT AT A LOCATION AND INDICATE THE RECOGNITION TO A USER AT THE LOCATION. The entirety of each of these Applications is incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

SUMMARY OF SOME EMBODIMENTS

In accordance with some embodiments, objects or game elements utilized in a table game that involves physical game elements (e.g., a card game involving physical wagering chips and/or physical playing cards) are equipped with unique identifiers that allow a particular game element (e.g., wagering chip or playing card) to be uniquely identified or game elements having a particular characteristic or belonging to a particular category (e.g., wagering chips of a particular denomination or from a particular chipset or playing cards of a particular suit) to be uniquely identified, in order to facilitate promotions or benefits associated with such objects. The present embodiments are directed to using technology such as radio frequency identification (RFID) technology or optical recognition technology to identify at a location an object or game element (e.g., an RFID-enabled wagering chip located at a card table), recognize that the object or game element is associated with a special designation or special functionality (e.g., that the RFID-enabled wagering chip corresponds to a special benefit to be provided to a player who wagers the chip), output an indication of the special functionality to a user at the location (e.g., a dealer of the card game and/or a player of the card game) and apply the special functionality to a transaction or event that the object or game elements is involved with. In some embodiments, the user of the object (e.g., a player of a table game utilizing a wagering chip or playing card comprising the object) is not aware of the special functionality (even if it has previously been associated with the object or game element) until the indication is output. For example, a server device may select (e.g., using a random or pseudo-random algorithm) one or more uniquely identifiable objects or game elements (or objects or game elements corresponding to a particular category or characteristic) for association with a special designation or special functionality different from, or in addition to, what the object or game element would normally be associated with. A component of the system operable to read or determine information (such as a unique identifier) from such one or more uniquely identifiable objects may recognize (e.g., when the one or more object or game element is utilized in a qualifying action) that the object or game element is one corresponding to the special functionality and be operable to apply the special functionality to a transaction or event.

In a more particular example, a server associated with a wagering establishment may select one or more RFID-enabled wagering chips being wagered by players (or available for wagering by players) to be associated with special functionality in order to dynamically implement promotions and awards at table games which are operable to read information from RFID-enabled wagering chips. In one embodiment, a card table equipped with at least one RFID-antenna may be operable to recognize when an RFID-enabled wagering chip which has been associated with a special functionality (e.g., a multiplier to be applied to any payout won when wagering with the chip) has been used in a qualifying action (e.g., wagered on a game event at the table), inform the dealer and/or player that the chip is associated with the special functionality, and apply the special functionality if appropriate (e.g., apply the multiplier to a payout won as a result of the game event).

Although many of the examples and embodiments provided herein are described with reference to the object recognized utilizing RFID technology as being an RFID-enabled game element such as a wagering chip or playing card, in other embodiments other types of objects may be recognized in a similar manner. Additionally, technology other than RFID technology may be utilized to uniquely identify a game element and select it for association with special functionality. For example, optically-read codes may be included on game elements that include unique identifiers by which such game elements or particularly categories of game elements may be identified for use in at least some embodiments described herein. U.S. Pat. No. 6,517,436, granted on Feb. 11, 2003 in the name of Soltys et al. and entitled METHOD AND APPARATUS FOR MONITORING CASINOS AND GAMING provides one example optical reader technology that may be used to uniquely identify game elements such as wagering chips or playing cards, and which technology may be re-purposed for the unique uses described herein.

In some embodiments, systems are provided which perform functions responsive to data obtained from RFID-enabled chips together with data received from a server device which manages promotions and awards at table games comprising electronic tables which are included in the system. Such functions may comprise, for example, (i) determining that an RFID-enabled chip wagered at a table game has been selected for a promotion, (ii) detecting that a qualifying activity has been performed involving the selected RFID-enabled chip, (iii) communicating the selection and qualification in a timely and useful fashion (e.g., alerting a player who has wagered the selected RFID-enabled chip that the wagering of the chip has qualified the player for the promotion, once the player wagers the RFID-enabled chip), and (iv) applying the promotion (e.g., applying the multiplier or other award corresponding to the selected RFID-enabled chip to a qualifying game event, such as the game event on which the RFID-enabled chip is wagered).

In some embodiments, systems are provided which perform functions responsive to data obtained from uniquely-identifiable game elements (e.g., wagering chips or playing cards) or game elements identified as associated with a particular characteristic or category, together with data received from a server device which manages promotions and awards at table games comprising electronic tables which are included in the system. The game elements may be uniquely-identifiable through RFID technology (e.g., game elements may include an RFID tag that stores and transmits a unique identifier) or through imaging or optically readable technology (e.g., the game elements may comprise machine-readable symbols or markings, such as a bar code, area or matrix codes or stacked codes that encode unique identifier). The functions performed responsive to the data may comprise, for example, (i) determining that a uniquely identifiable game element identified at a table game has been selected for a promotion, (ii) detecting that a qualifying activity has been performed involving the selected uniquely identifiable game element, (iii) communicating the selection and qualification in a timely and useful fashion (e.g., alerting a player associated with the selected uniquely identifiable game element that the an activity corresponding to the player and involving the game element has qualified the player for the promotion, once the player engages in the activity that so qualifies the player), and (iv) applying the promotion (e.g., applying the multiplier or other award corresponding to the uniquely identifiable game element to a qualifying game event, such as the game event in which the uniquely identifiable game element was utilized).

BRIEF DESCRIPTION OF THE DRAWINGS

FIG. 6 illustrates a table storing data defining a plurality of RFID-enable chips, useful for some embodiments.

DETAILED DESCRIPTION OF SOME EMBODIMENTS

Figure 1:
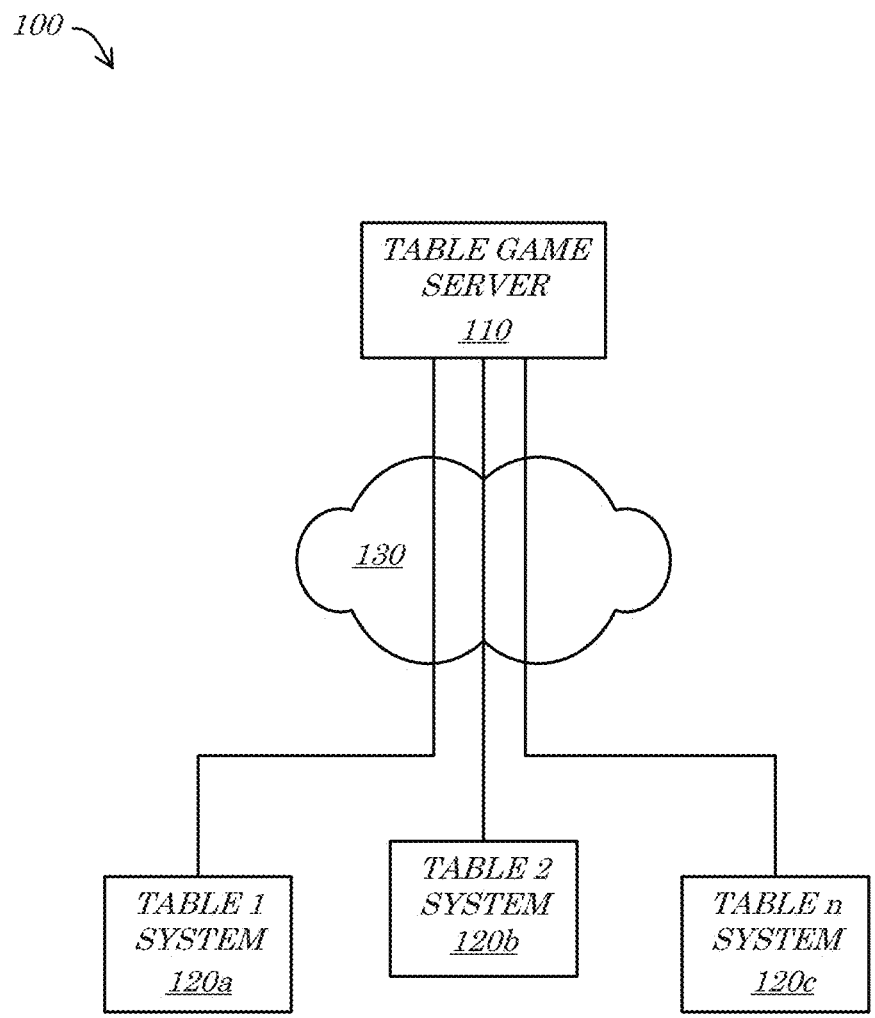
FIG. 1 illustrates an example system operable to facilitate at least some embodiments described herein.

In accordance with some embodiments, described herein are systems, processes and articles of manufacture which provide for utilizing a game table (e.g., a table which supports a baccarat, blackjack or roulette game) that comprises technology for identifying data from game elements used thereon (e.g., RFID technology or optical imaging technology) to facilitate dynamic promotions and awards. The table may be an RFID-enabled table, an imaging-enabled table or include other types of technology that allows for uniquely identifying game elements utilized for games played thereon or for identifying game elements that correspond to a particular characteristic or category. An RFID-enabled table, as the term is used herein, comprises a table operable to facilitate a game (e.g., a card game such as baccarat) and equipped with at least one RFID antenna or interrogator (described in more detail elsewhere herein). Examples of an RFID-enabled table that may be useful for at least some embodiments described herein are described in (i) U.S. Patent Publication No. 2016/0016071, filed on Sep. 28, 2015 in the name of Walker et al. and entitled RFID SYSTEM FOR FACILITATING SELECTIONS AT A GAME APPARATUS; (ii) U.S. Pat. No. 9,262,885 filed on Jun. 5, 2012 in the name of Moore et al. and entitled METHODS AND SYSTEMS FOR FACILITATING TABLE GAMES, each of which is incorporated by reference herein. Some examples of other technologies that may be utilized to implement at least some embodiments described are described in the following patents: (i) U.S. Pat. No. 5,782,647 to Fishbine et al.; (ii) U.S. Pat. No. 5,103,081 to Fisher et al; (iii) U.S. Pat. No. 5,548,110 to Storch et al.; and (iv) U.S. Pat. No. 4,814,589 to Storch et al. Each of the foregoing patents are incorporated by reference herein and disclose various systems and methods for encoding information on chips and for determining information encoded in the color, geometry, size or patterns on a chip, any of which technologies may also be utilized to encode information on a playing card in accordance with some embodiments described herein.

A table that is equipped with RFID-enabled technology, optical imaging technology or other technology that allows reading of data from one or more game elements used for games playable on the table is referred to as an electronic table herein. For purposes of clarity, the example embodiments described herein will primarily refer to an RFID-enabled table that utilizes RFID technology to read data from (or transmit data to) game elements (e.g., to read data from wagering chips or playing cards) as well as optical imaging-enabled table that utilizes imaging technology to read data from game elements (e.g., to read bar codes or other codes embedded in or included on one or more playing cards). However, the embodiments described herein are not limited to implementations utilizing RFID or imaging technology and other technologies may be substituted for the RFID and optical imaging example implementations described herein.

In accordance with some embodiments, systems, processes and articles of manufacture provide for leveraging the technology (e.g., RFID-reading capability or optical imaging capability) of an electronic table for functions such as detecting when a particular game element (or a game element associated with a particular characteristic or category) has been utilized in a qualifying action (e.g., wagered (in the case of a wagering chip), or dealt or kept in a hand (in the case of a playing card) on the electronic table, determining (e.g., in real-time) that the detected game element (e.g., RFID-enabled chip or playing card equipped with optically readable code) has been selected for a promotion, award or other special functionality and applying the promotion, award or other special functionality with respect to the game element (or a transaction or event in which the game element is utilized) if appropriate. In accordance with some embodiments, the system (e.g., via a server which communicates with a plurality of RFID-enabled tables in a casino and has access to a database or other memory defining RFID-enabled chips which are active in the casino) may be operable to select (e.g., on a random or pseudo-random basis) one or more particular game elements or game elements corresponding to a particular characteristic or category (e.g., at least one RFID-enabled wagering chip or at least one playing card) for at least one promotion, award or special functionality. A game element (e.g., wagering chip or playing card) which has been selected for a promotion, award or other special functionality is referred to herein as a selected game element. The system may then be operable to make the selected game element(s) known to the electronic table(s) with which it is operable to communicate (e.g., unique identifiers of the selected wagering chip(s) or playing card(s) may be transmitted to the one or more tables along with, in some embodiments, the particular promotion, award or other special functionality which is associated with the respective selected game element(s)). In some embodiments, a processor and/or program of a particular electronic table may be operable to make such a selection and thus there may be no need to transmit the information to an electronic table. The electronic table that receives or determines the unique identifiers of one or more selected game elements (or receives information identifying the category or characteristic of a group of selected game elements) may, in turn, be operable to determine when a qualifying action has been taken with respect to a selected game element (e.g., to detect that a selected wagering chip has been wagered on a game event at the table), inform an associated player and/or the dealer of the table that a particular game element (e.g., a wagering chip placed on a particular bet spot of the table or a playing card dealt to a particular player position) is a selected game element and facilitate application of the promotion, award or other special functionality of the game element to a transaction or event.

Examples of promotions, awards or other special functionalities which may be associated with a selected game element include, without limitation: (i) a multiplier is applied to a payout won as a result of the selected game element comprising a wagering chip being wagered or a payout won as a result of a selected game element comprising a playing card being included in the winning hand (e.g., a 2×-10× multiplier); (ii) a probability and/or payouts structure more favorable to the player is utilized to determine a result of a game event on which the selected game element comprising a wagering chip is wagered or to determine a result of a game event in which a game element comprising a playing card is included in a hand of the game event; (iii) one or more rules of the game are modified (or an alternate rule is utilized) to determine a result of a game event on which the selected game element comprising a wagering chip is wagered or in which game event the selected game element comprising a playing card is utilized (e.g., the player may switch sides in a baccarat game or take an extra card); (iv) the player is automatically provided with an award or prize (whether monetary or non-monetary); (v) the player automatically qualifies for a level, stage, phase or aspect of the game the player would not otherwise qualify for; (vi) a value of a playing card, wager, wagering chip is modified to a value more favorable to the player (e.g., in a manner that causes a more favorable result to be determined for the player when determining a result of a card game); and (vii) the player is entered into a raffle or other promotion.

In one example embodiment, the special functionality when applied may provide to the player a free or automatic attempt or entry to win a bonus prize. For example, some implementations of card games may include a bonus or prize wheel that a player may be allowed to spin (or virtually spin) upon satisfying at least one condition. In one embodiment, one such condition may be that the player is associated with a game element that is designated as a selected game element and that is determined to be applicable to a game event. Thus, if the player's game element is a selected game element the player may be allowed a free spin of the prize wheel. In one embodiment, a prize on the prize wheel may comprise one of a fixed monetary amount listed on a slice on the wheel, a progressive "jackpot" slice on the wheel, a free bet on the next hand or a multiplier to be applied to payout won for a current or subsequent hand. Of course, a prize wheel is just one example implementation of how an entry or chance at a bonus prize may be resolved and a special functionality comprising an entry into a bonus prize pool may be implemented in other manners (e.g., a raffle drawing, a slot machine type spin, etc.).

In some embodiments, a special functionality associated with a game element may, when applied to a transaction or event, impact other aspects of a player's experience with a gaming establishment in addition to or in lieu of the card game itself. For example, special functionality may entitle the player to a prize such as a free hotel night, a t-shirt, a promotional cash aware, a discount on merchandise or services, an upgrade in the player's experience with the gaming establishment or a related establishment, an entry into a contest, a progressive amount or bonus pool, a jackpot that is not on the paytable, a benefit at another gaming property, a benefit at an associated retailer or establishment, etc.

In some embodiments, the special functionality associated with a game element may be applied to a subsequent card game (i.e., a card game played by or participated in by the player subsequent to the current card game in which the special functionality is determined or revealed to the player). In some embodiments, the player may choose to save the special functionality and choose when to apply it. In other embodiments, the special functionality may be applied to an event at the discretion or choosing of the gaming establishment.

In some embodiments, the particular promotion, award or other special functionality associated with a selected game element is selected and assigned to the game element upon it being selected for the promotion, award or other special functionality. In other embodiments, a particular game element may already be associated with a particular promotion, award or special functionality which may be in an "inactive" state until and unless the game element becomes a selected game element, at which time the promotion, award or other special functionality is modified to be in an active state (i.e., the promotion, award or other special functionality is available for application to a game event in which the selected game element is utilized). In some embodiments, a particular game element may be associated with a particular promotion, award or special functionality and considered a selected game element prior to a game event (e.g., at the time it is purchased, in the case of a wagering chip or at the beginning of a game and while it is still in the shoe, in the case of a playing card) but a player and/or dealer is not informed of this unless/until the game element is utilized (e.g., wagered or dealt) in a game event.

In some embodiments, as described in more detail herein, a qualifying action may need to be performed (e.g., by a player associated with a selected game element, such as a player who comes to possess the selected game element) in order for the promotion, award or other special functionality to be applied to a game event (e.g., the selected game element comprising a wagering chip may be required to first be wagered on a game event, on a game event within a specified time frame, as part of a minimum total wager amount, on a particular table or type of table, on a particular game or type of game, etc.).

In accordance with some embodiments, a system is provided which includes at least one table having a plurality of antennas or interrogators placed thereon, for use in recognizing the placement of an RFID-enabled chip on one or more positions of the table or components of the table (e.g., an RFID-enabled chip tray). For example, an antenna placed on the table may be operable to read a unique chip identifier from each an RFID-enabled chip placed within a range of the antenna.

In accordance with some embodiments, an electronic table comprises at least one processor and a memory storing a program which, when executed by the processor causes the processor to perform at least one of the functionality described herein. For example, the processor may be operable with the program to (i) receive (e.g., from a server device, such as table game server 110 of FIG. 1) information describing at least one selected game element (e.g., a wagering chip or a playing card), the information including at least one of a unique identifier of each selected game element or an identifier corresponding to a game element having a certain characteristic or belonging in a certain category; (ii) read the identifier of a game element (e.g., a wagering chip wagered at table or a playing card dealt for a game at the table); (iii) determine when there is a match between the read identifier of a game element detected at a table (e.g., of an RFID-enabled chip wagered on the table) and a unique identifier of a selected game element, thereby identifying that a selected game element is in use at the table; (iv) determine or identify the promotion, award or other special functionality associated with the game element identified as in use (e.g., a wagered selected wagering chip); (v) output an indication of at least one of the selected game element and/or the promotion (e.g., output via a user interface to a dealer and at least one player of the table that a wagering chip being wagered on the table is a "lucky" chip that will result in a benefit being bestowed upon the player who wagered or won the lucky chip); and (vi) facilitate the promotion, award or other special functionality to be applied to a game event at the table. As an example of step (vi), the processor may be operable to apply an appropriate multiplier to a payout won by a player who wagered the selected game element comprising a wagering chip, thereby determining the total payout to be provided to the player by a dealer of the table, and may output an indication of this total payout to the dealer and/or player.

Various systems and several examples are provided herein. The present disclosure will focus on baccarat as an example, but it should be appreciated that similar functionality may be applied to other electronic table games such as blackjack, roulette, craps, Sic Bo, Pai Gow (tile and poker variations), LET IT RIDE™, CARIBBEAN STUD™, 3-CARD POKER, 4-CARD POKER, SPANISH 21, variants of such games (e.g., Chemin de Fer), or the like.

Referring now to FIG. 1, illustrated therein is a system 100 which may be useful in implementing at least some embodiments described herein. The system 100 may comprise, for example, a system within a particular gaming establishment which includes a plurality of electronic tables for facilitating card games. In accordance with at least some embodiments, the system 100 includes a table game server 110 (e.g., for managing wagering, player and/or game activities at one or more connected electronic tables) that is in communication, via a communications network 130, with one or more table systems 120. In some embodiments, the table game server 110 may comprise a bonus or promotion server the primary function of which is to manage and administer promotions or bonuses throughout a casino (e.g., bonuses or promotions at qualifying RFID-enabled tables, in accordance with some embodiments described herein).

The table game server 110 may communicate with the table systems 120 directly or indirectly, via a wired or wireless medium such as the Internet, LAN, WAN or Ethernet, Token Ring, or via any appropriate communications means or combination of communications means. Each of the table systems 120 may comprise computers, such as those based on the INTEL® PENTIUM® processor, that are adapted to communicate with the table game server 110. Any number and type of table systems 120 may be in communication with the table game server 110, although only three (3) are illustrated in the example of FIG. 1.

Communication between the table systems 120 and the table game server 110, and (in some embodiments) among the table systems 120, may be direct or indirect, such as over the Internet through a Web site maintained by table game server 110 on a remote server or over an on-line data network including commercial on-line service providers, bulletin board systems and the like. In yet other embodiments, the table systems 120 may communicate with one another and/or table game server 110 over RF, cable TV, satellite links and the like.

Some, but not all, possible communication networks that may comprise network 130 or be otherwise part of system 100 include: a local area network (LAN), a wide area network (WAN), the Internet, a telephone line, a cable line, a radio channel, an optical communications line, a satellite communications link. Possible communications protocols that may be part of system 100 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In some embodiments, the table game server 110 may not be necessary and/or preferred. For example, at least some embodiments described herein may be practiced on a standalone table system 120 and/or a table system 120 in communication only with one or more other table systems 120 or a dedicated server device. In such an embodiment, any functions described as performed by the table game server 110 or data described as stored on the table game server 110 may instead be performed by or stored on one or more table systems 120.

Figure 2:
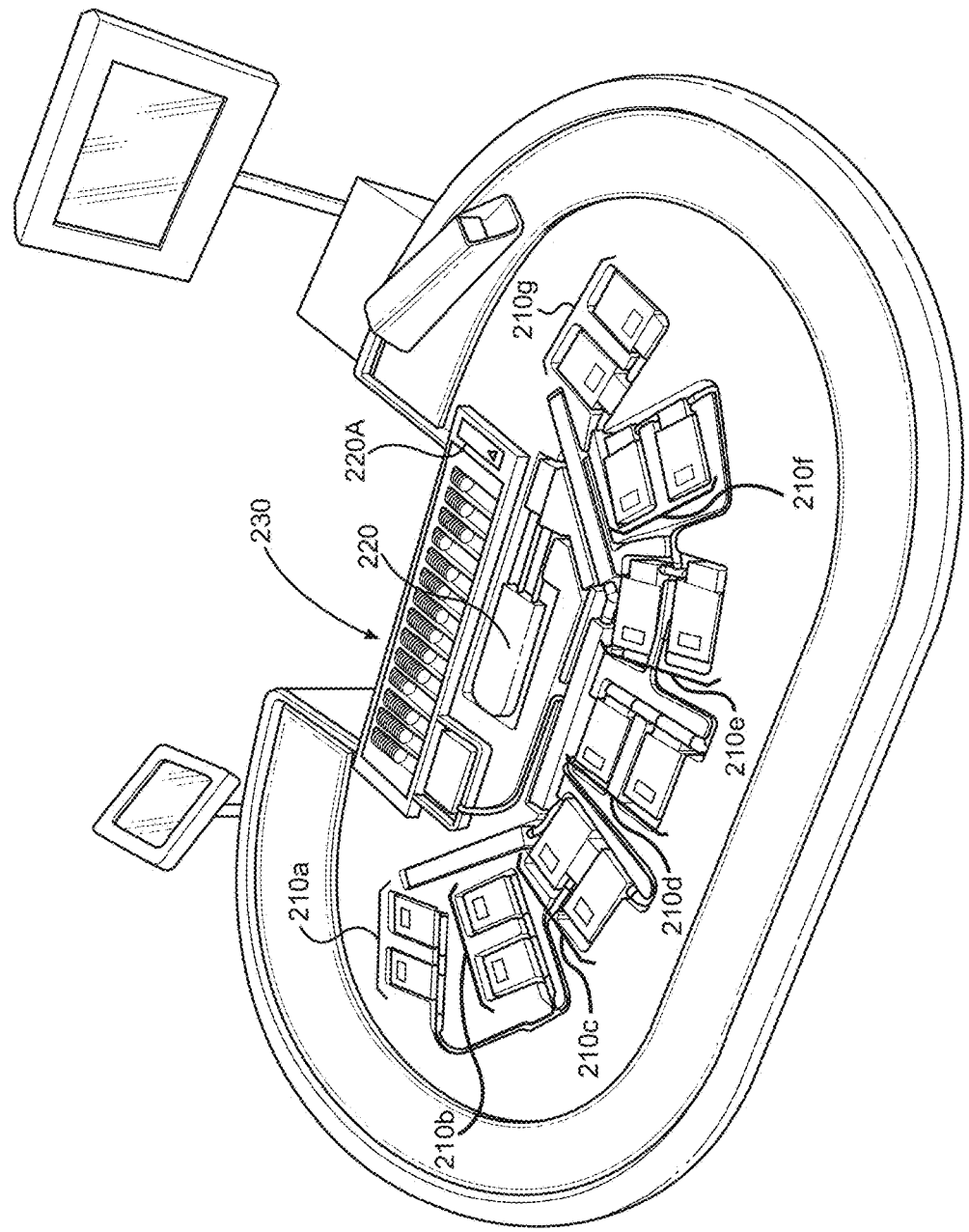
FIG. 2 illustrates a diagram of an antenna or interrogator layout on a smart table for facilitating a baccarat game, in accordance with some embodiments.

Referring now to FIG. 2, illustrated therein is one embodiment of how a plurality of interrogators or antennas may be placed on a table comprising an RFID-enabled table (which may be one embodiment of table system 120 of FIG. 1), in a manner that facilitates some of the embodiments described herein. The table illustrated in FIG. 2 includes seven (7) distinct player positions arranged in a semi-circular configuration. Placed at each respective player position is a set of two antennas or interrogators 210a-210g, one for each bet spot or bet position available at each respective player position. For example, one antenna at a respective player position may be for recognizing a bet on Banker (e.g., recognizing RFID-enabled chips placed on the Player bet spot) and the other antenna may be for recognizing a bet on Player (e.g., recognizing RFID-enabled chips placed on the Player bet spot). Thus, if a player were to place a wager (e.g., one or more RFID-enabled chips) on a bet spot associated with one of the antennas at the player position associated with the set of antennas 210a, the antenna would recognize such placement (i.e., the antenna nearest to which the chips are placed would "acquire" or recognize and identify the chip(s) comprising the wager).

The table illustrated in FIG. 2 further comprises a dealer area at which is positioned an antenna 220. The dealer area antenna 220 may facilitate, for example, calculations and verifications of stack totals for table fills, credits, buy-ins and color-ups (e.g. by reading and providing data regarding one or more chips acquired by the dealer area antenna 220).

In some embodiments, a smart table such as that illustrated in FIG. 2 may include an RFID-enabled chip tray 230 within which is placed at least one antenna 220A. In some embodiments, an RFID-enabled chip tray comprises two layers or trays (e.g., an upper tray and a lower tray within the same housing) and each tray may be associated with (e.g., have placed within its area) its own antenna. For example, one antenna may be placed beneath the upper tray and function to read the chips in the upper tray while another antenna may be placed beneath the lower tray and function to reads the chips in the lower tray. In one embodiment, the trays may be read or "scanned" independently (i.e., the value or other data of chips placed therein may be read); in other embodiments, the chips in the upper and lower trays may be read simultaneously. In one embodiment, the chip tray antenna(s) 220A may interact with the dealer area antenna 220 (or a processor which receives data from both the chip tray antenna(s) 220A and the dealer area antenna 220 may take into account the data of the antenna(s) 220A along with the data of the antenna 220) to ensure that chips implicated in certain transactions (e.g., chips included in Fill transactions) are actually recognized as having been placed into the chip tray after being counted and confirmed on the dealer antenna.

In some embodiments (not shown in FIG. 2), a table system 120 may include at least one shared or common bet positions or bet spots, each associated with a distinct antenna. For example, in one embodiment particular types of additional bets may be made available via shared or common bet positions and each such bet spot may include its own antenna: one antenna may be placed at a Player Pair bet spot, another antenna may be placed at a Banker Pair bet spot, and two antennas may each be placed at a Tie bet spot. Further, Applicants have recognized that in some cases, it may be beneficial to provide for common or "shared" betting areas. That is, rather than associating or providing a plurality of physical betting areas for each individual player seated at the gaming table, it may be beneficial to instead offer one or more common betting areas (each associated with a given wager type), accessible to all players. Each such common or shared bet spot may have associated therewith its own antenna.

In some embodiments, player wagers placed upon such shared betting areas of the gaming table may be identified and/or associated with respective player(s) having placed such wagers via one or more RFID antennas incorporated into the layout of the table itself. In one embodiment, a player desiring to place such a wager may indicate his interest in doing so (e.g. audibly, via a hand signal) to the dealer. Thereafter, the dealer may place physical chips representing the player's wager on a first dedicated area of the gaming table associated with the player (e.g., a player position of the table at which the player is sitting), the first dedicated area being associated with a particular RFID antenna. The RFID antenna may then transmit an indication of the wager amount and associated player (or player position) to a processor (e.g., a processor of the table system), which then stores data associated with the wager. Thereafter, the dealer (and/or player) may move the chips representing the player's wager to a second "shared" area of the gaming table, which may be associated with a second RFID antenna.

In accordance with some embodiments in which game elements comprise RFID-enabled wagering chips, the system (e.g., a processor of the table which is operable to communicate with the RFID antennas of the table) may be operable to check each chip detected on the table within certain qualifying areas or within range of certain antennas (e.g., player bet spot antennas or a shared bet spot antenna) to determine whether the chip is a selected chip (e.g., compare the chip identifier read from the chip against a database of selected chips). If the system detects that one of the chips placed on the table is a selected chip, it may indicate (in one of various manners, as described elsewhere herein) that one of the chips placed on the table (if more than one is placed at a given time) is a selected chip. In one embodiment, a message output to a dealer and/or player comprising an indication that a chip placed on the table is a selected chip may indicate the antenna, player position or bet spot in which the selected chip is present and/or identify at least one other characteristic of the selected chip (e.g., denomination, chip set identifier, chip identifier, etc.) to allow for easier visual identification of the selected chip by the dealer and players. In one embodiment, the determination of whether a placed chip is a selected chip and the outputting of an indication that a selected chip has been detected (if in fact a selected chip is detected) may be output when the chips are placed in the first designated area. In another embodiment, one or both of (i) determining whether a placed chip is a selected chip; and (ii) outputting an indication that a selected chip has been recognized on the table, may be done when the chip(s) is/are placed in the shared betting area rather than when they/it are in the first designated area.

Returning to the description of a shared betting area wager, upon resolution of a game instance associated with the wager (e.g. upon completion of a hand of baccarat), an outcome associated with the wager is determined (e.g. win/loss) along with any corresponding payout that may be entitled to the player. If the player is entitled to a payout, the dealer may then place chips representing such payout on the second dedicated area of the table. The payout provided by the dealer is recorded by the table computer via the second RFID antenna. The original wager and payout may then be placed on the first dedicated area (associated with the first RFID antenna), serving to thereby record an indication of the payout having been provided to the associated player. If the payout qualifies for an increase based on a selected chip having been part of the wager which resulted in the payout being won (and if the special functionality associated with the selected chip is an increase in the regular payout, such as a multiplier function) the system may calculate the increase in the payout and output to the dealer an indication of the increased payout amount to be provided to the player and verify that the dealer has provided the player with the appropriate increased payout amount.

In one embodiment, once the special functionality of a selected game element (e.g., a selected wagering chip) has been applied to a given transaction or game event, the selected game element may no longer be considered a selected game element that is associated with the special functionality (e.g., its status in a database may be changed or it may be removed from a database of selected game elements).

Similar functionalities, processes and rules to that described above with respect to an embodiment in which game elements comprise RFID-enabled wagering chips may be implemented for game elements comprising playing cards (whether RFID, image recognition or other technology is employed for recognizing the playing cards). For example, once a playing card having an identifier corresponding to special functionality is detected as having been dealt or having been retained by a player in a hand after having been dealt to the player, the player may be informed that he is the holder of a "lucky" card and the special functionality corresponding to the card may be applied to the hand (e.g., a multiplier associated with the card may be applied to a payout due to a player as a result of the hand in which the playing card is included).

Returning to the description of the RFID-enabled electronic table that may be used to implement some embodiments described herein, antennas incorporated into a table such as the table illustrated in FIG. 2 may be placed within an insert under the felt or other covering of the table. Each antenna may have a predetermined range within which it recognizes, determines, identifies or acquires a chip. Thus, if one or more chips comprising a wager is placed within the acquire range of a particular antenna, it may be inferred or determined that a player (e.g., the player who is associated with the acquired chip(s)) is placing a bet on the bet spot associated with the antenna.

It should be noted that the number and placement of antennas illustrated in FIG. 2 is exemplary only and should not be construed in a limiting manner. For example, more than two antennas may be associated with a given player position. In some embodiments, a first antenna associated with a given player position is associated with a first player (e.g., the primary player playing at that position) while a second antenna associated with a given player position is associated with a second player (e.g., a remote player or back betting player). In some embodiments, each antenna of a table may be uniquely identified, such that if data or information is received from a particular antenna, that data or communication may comprise a unique identifier of the antenna that allows for a determination of the bet spot and player position associated with that data or communication.

An antenna such as any of those illustrated with respect to FIG. 2 may determine, read, receive, obtain, recognize or determine various information or data from or about an RFID-enabled chip placed within a predetermined range of the interrogator. The following are examples or some of the information or data that may be so determined: (i) a unique chip identifier, which uniquely identifies the chip; (ii) a currency of the chip; (iii) a denomination of the chip (which may be its monetary value; in the case of a token it may comprise the token type); (iv) a chipset identifier, which differentiates types of chips or represents a category of a chip (e.g., cash vs. non-negotiable, promotional, differentiating tokens from monetary chips, chip validity); (v) a casino identifier that uniquely identifies a casino or other registered gaming corporation associated with the chip (this information may also be used to determine chip validity); and (vi) a site identifier that uniquely identifies the physical casino site for which the chip is valid. It should be noted that not all of the above information is necessary or desirable for all embodiments. It should further be noted that any or all of the above-listed information may be stored in a memory of a given chip and transmitted to an interrogator via a signal from the chip.

Figure 3A:
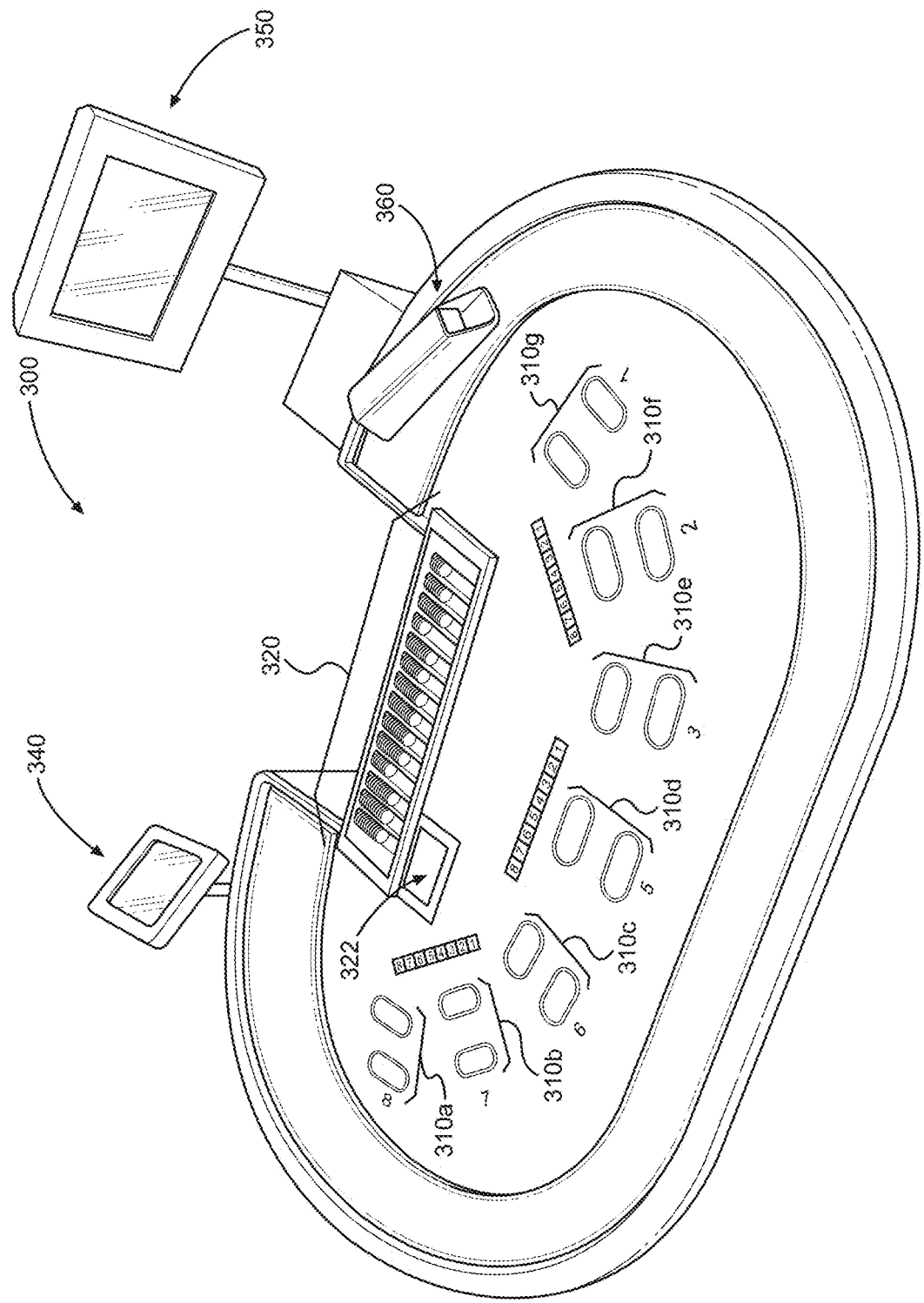
FIG. 3A illustrates a top planar view of a smart table for facilitating a baccarat game, in accordance with some embodiments.

Referring now to FIG. 3A, illustrated therein is a planar view of an electronic table 300, which may be operable to facilitate one or more embodiments described herein. The electronic table 300 may comprise the table of FIG. 2, but with a felt or other covering placed over the antennas located underneath. In many respects, the electronic table 300 may appear to a player as a regular baccarat table, with the RFID capabilities of the table not being readily discernable. The table 300 is configured for a baccarat game but the embodiments described herein are not limited to baccarat and a similar table may be provided with a top layout appropriate for facilitating another game (e.g., blackjack).

Although RFID technology is described as an example of technology that may be utilized to implement the dynamic promotions and special functionalities for game elements described herein, other types of technologies such as optical or imaging technology may also be used. In embodiments utilizing technology other than RFID technology to read identifiers or other information of game elements, an electronic table may have some components that are different than those described with respect to FIGS. 2, 3A-3C and 4 (e.g., optical readers, bar code scanners or cameras may be utilized instead of RFID interrogators or antennas). However, some of the components described with respect to FIGS. 2, 3A-3C and 4 may also apply to embodiments utilizing alternate technology. For example, a processor, memory, databases, dealer and/or player displays and one or more programs or subroutines similar to that described with respect to the RFID embodiments of FIGS. 2, 3A-3C and 4 may be utilized in embodiments utilizing other types of technologies to identify information from game elements.

The rules of baccarat are well understood, but the interested reader is directed to www.wizardofodds.com/baccarat for a more detailed explanation. Table 300 comprises an electronic table configured to facilitate a baccarat game and includes a dealer area within which is located a dealer display 322 and an RFID-enabled chip tray 320. The dealer display may be utilized to output data or prompts to a dealer during the course of game play. For example, the dealer display 322 may be utilized to output to the dealer at least one of (i) an indication that a chip wagered or otherwise utilized in a qualifying action on the table is a selected chip, (ii) an indication of which player at the table is associated with a selected chip detected on the table, (iii) an indication of an antenna which detected a selected chip on the table, (iv) a special functionality (e.g., payout multiplier) associated with a selected chip detected on the table; (v) a commission amount to be collected from one or more players, (vi) a payout to be provided to one or more players (e.g., including an additional amount of payout, if any, to be provided based on a special functionality associated with a selected chip), and (vii) an amount in lost wagers to be collected from one or more players.

The table 300 further includes seven (7) player positions 310*a*-310*g*, each player position including a Banker bet spot and a Player bet spot. Of course, any number of player positions may be utilized. Further, in some embodiments the table may include additional bet spots such as shared or common bet spots (e.g., for use as described elsewhere herein).

The table 300 further includes a display 340 which a dealer or other gaming establishment personnel may utilize to access information regarding game events, transactions, chip tray variances or other data related to the table 300. For example, a dealer may utilize dealer display 340 to determine or provide additional information about a selected game element detected on the table (e.g., to indicate to the system that a player associated with a selected game element comprising a wagering chip has been informed that he has wagered a selected chip and the special functionality associated with the selected chip and/or to verify that the special functionality has been applied to the current game event).

The table 300 further includes another display 350 which faces the players and may show data to players such as recent historical outcomes (sometimes referred to as a "trend board"). Players sometimes use such historical outcomes in an effort to predict trends within a series of game instances. In accordance with some embodiments, the display 350 may also output other information to the players, such as at least one of (i) an indication that a game element utilized in a qualifying action on the table is a selected game element, (ii) an indication of which player at the table is associated with a selected game element detected on the table, (iii) an indication of an antenna or other table component (e.g., imaging device such as a camera) which detected a selected game element on the table, and (iv) a special functionality (e.g., payout multiplier) associated with a selected game element detected on the table.

Returning now to the description of FIG. 3A, the table 300 further includes an electronic card shoe 360 via which cards for the game are shuffled and dealt. In accordance with some embodiments, the electronic card shoe 360 may communicate with a processor (e.g., a processor of the table 300) to communicate data regarding cards dealt and/or remaining in the shoe. In embodiments in which the electronic table is equipped with imaging technology, the electronic card shoe 360 or the table 300 may be equipped with an imaging device that reads information (e.g., a unique identifier, rank, suit or other characteristic) from playing cards being dealt from the card shoe 360. For example, the table may include includes a card reader with a card reading head and drive mechanism to read information from the a pre-determined portion of each of the playing cards while all of the playing cards in the card deck are in the electronic card shoe 360. In one embodiment, the card reading head includes a linear or two-dimensional charge-coupled device ("CCD") array, although the card reading head can employ other scanning and imaging devices. For example, the card reading head can employ imaging tubes (e.g., Vidicon™, Plumbicon™), and other image capture devices. Image data from the linear CCD array can then transmit data to a processor of the table (e.g., processor 484 of FIG. 4) for processing. An example imaging system that may be utilized for reading information from game elements comprising playing cards and/or wagering chips is described in detail in U.S. Pat. No. 6,517,436, granted on Feb. 11, 2003 in the name of Soltys et al and entitled METHOD AND APPARATUS FOR MONITORING CASINOS AND GAMING, which is incorporated by reference herein in its entirety, and particularly FIGS. 4-8 and the attendant descriptions thereof.

The table 300 may include additional components (at least some of which may not be easily visible to a player or other observer) such as one or more processors, a memory storing a general program and one or more specialized software applications which, in combination with data obtained from the RFID antennas or image reading components located on the table, may facilitate many of the functions described herein (e.g., tracking wagering activity and game outcomes, determining whether a chip wagered on the table is a selected chip, tracking playing cards dealt for a game on the table, etc.).

Figure 3B:
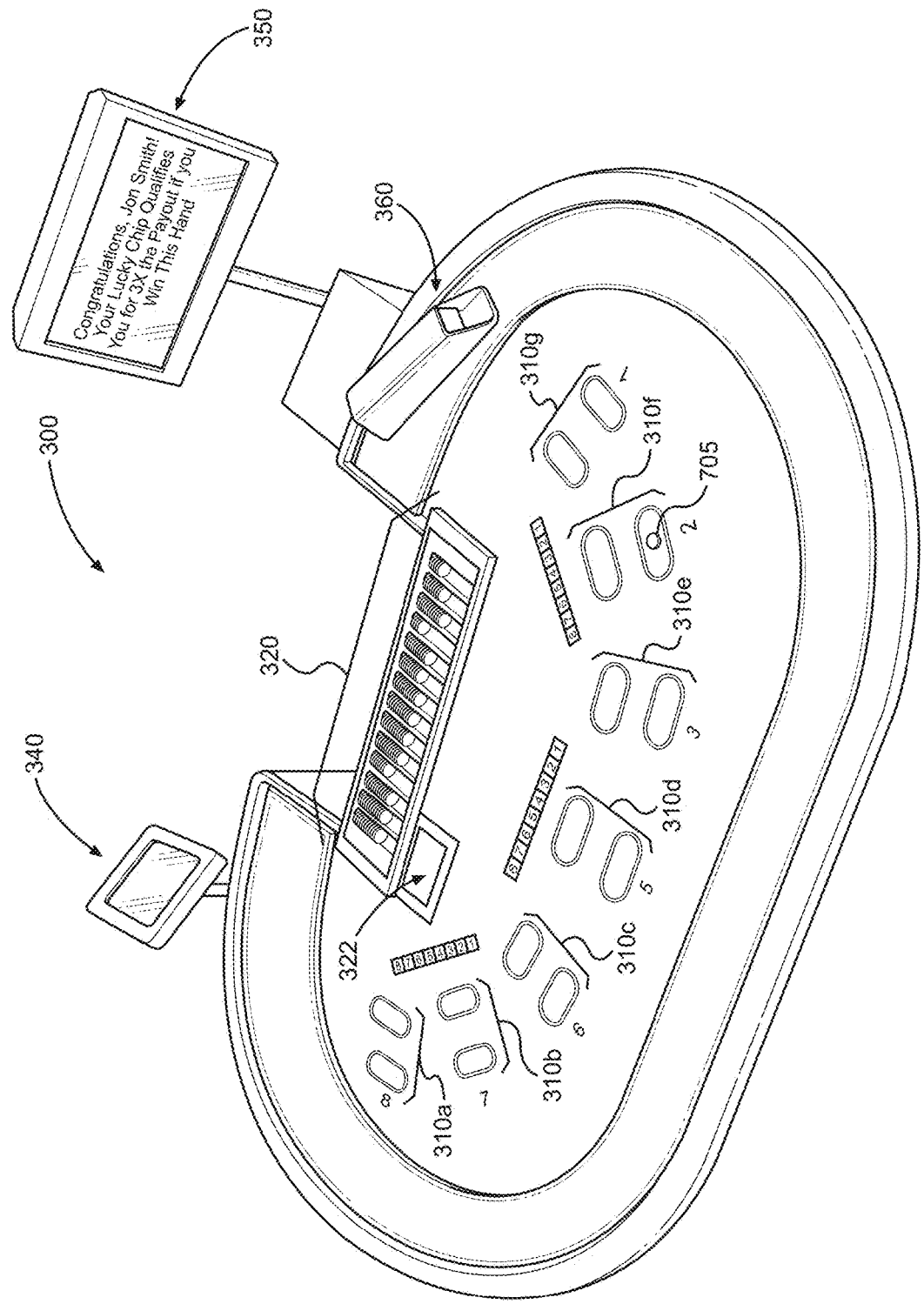
FIG. 3B illustrates a top planar view of a smart table for facilitating a baccarat game which is outputting one type of example indication to a player that a wagered RFID-enabled chip qualifies as a selected game element, in accordance with some embodiments.

Turning now to FIG. 3B, illustrated therein is a version of the table 300 with the display 350 outputting a message to a player of the table (the message, in accordance with some embodiments, being visible to all players at the table and other persons near the table). In accordance with some embodiments, the message output via display 350 of Figure B indicates that player "Jon Smith" has wagered a lucky chip (illustrated as chip 705 in player position 310*f*), which entitles the player to 3× the payout he would otherwise be provided if he wins the current hand on which he has wagered the chip 705.

In accordance with some embodiments, a player who possesses a selected game element (e.g., a selected wagering chip or a selected playing card) may not be aware of the fact that one of his/her game elements is a selected game elements and/or the special functionality of the selected game element unless or until he/she uses the selected game element in a qualifying action (e.g., until he/she wagers the selected game element comprising a wagering chip on a qualifying electronic table or until he/she uses the selected game element comprising a playing card in a hand on a qualifying electronic). In some embodiments, a game element may be selected or tagged in a memory of the table system as a selected game element for a significant amount of time (e.g., hours, days or longer) prior to a player in possession of the game element using the selected game element in a qualifying manner and/or being informed that the game element is a selected game element (this may particularly be the case in embodiments in which game elements comprise wagering chips, which may be purchased, won or otherwise obtained by players at least hours before being used in a game).

For example, in some embodiments in which a game element comprises a wagering chip, the player's chip may be designated as a selected chip at the time the player receives the chip from a casino cage while in other embodiments a chip may be designated as a selected chip after the player purchases the chip from the casino or wins it from the casino or another player. For example, the system 100 may randomly and remotely select chips (by selecting certain identifiers or serial numbers of RFID-enabled chips which are active on the casino floor) in accordance with a selection process which may be triggered randomly, upon a triggering condition being satisfied or upon demand by casino personnel, and store such chip identifiers in a database defining selected and active chips.

In another example of an embodiment in which a game element comprises a playing card, the system 100 may randomly and remotely select playing cards or a characteristic or category of playing cards (by selecting certain identifiers or serial numbers that uniquely identify particular playing cards or that identify playing cards corresponding to the selected characteristic or category). In some embodiments, the system 100 may so select playing cards out of a pool of all playing cards which are actively being used on the casino floor or other specific area of the casino while in other embodiments the system 100 may so select the playing cards out of a pool of playing cards in a particular deck, being used for a particular hand or game or that are in a particular electronic card shoe. In one embodiment, a predetermined number (e.g., one) playing card is randomly selected as a "lucky" playing card at the beginning of each hand or game initiated on a table. In accordance with some embodiments, a selection process may be triggered randomly, upon a triggering condition being satisfied or upon demand by casino personnel. An identifier of a selected playing card or group of selected playing cards may then be stored (E.g., in the local memory of an electronic table or in a more centralized memory that stores information for a plurality of electronic tables), such as in a database defining selected playing cards.

In some embodiments, a game element (e.g., a wagering chip or playing card, whether RFID-enabled or equipped with a code readable via imaging technology) may not be pre-designated as a selected game element and then recognized as being a selected game element at a later time. Rather, in some embodiments, a game element may be designated as a selected game element upon being utilized in a qualifying event. For example, a wagering chip may be designated as a selected wagering chip at the time it is wagered (e.g., upon being detected at a bet spot of an electronic table). In another example, a playing card may be designated as a selected playing card as it is dealt out of an electronic card shoe and handed to a player for use in his/her hand. In some such embodiments, the designation of a game element as a selected game element may occur substantially at the time the dealer and/or player(s) is/are informed that the game element is a selected game element. For example, in some embodiment an occurrence of one or more predetermined conditions (e.g., when a wagering chip is wagered or used in some other qualifying action, when a playing card is held by a player after having been dealt to the player, an occurrence of a particular time, a randomly determined triggering made in accordance with an algorithm, etc.) may initialize a subroutine for determining whether (i) a particular game element (e.g., an RFID-enabled wagering chip, such as the wagering chip which was most recently wagered, which caused an initialization of the subroutine) should be designated as a selected game element; and/or (ii) a condition for designating a game element as a selected game element has been satisfied (e.g., such that, if it has, a particular qualifying game element comprising an RFID-enabled chip, such as one most recently wagered in a qualifying manner, may be designated as a selected chip). Such a sub-routine for determining that a game element should be designated as a selected game element may be performed by, for example, a server device (e.g., table game server 110), a processor of a table (e.g., a processor of a table system 120), another computing device or a combination of any of the foregoing. In such embodiments in which a game element comprises a wagering chip, rather than a player unknowingly walking around with a selected wagering chip and not knowing it is a selected wagering chip unless or until utilizing it in a qualifying action (or a player hoping that one of his/her chips is a selected chip), a player may benefit from having one of his chips designated as a selected chip upon wagering it or otherwise using it in a qualifying manner or at an opportune time (e.g., at a time when it is determined that a chip at a table should be designated as a selected chip and a benefit of a promotion provided to a player associated with the chip).

In embodiments in which a game element comprises a wagering chip and the designation of a wagering chip as a selected wagering chip is not performed unless or until the wagering chip is wagered or otherwise used in a qualifying action (as opposed to embodiments in which a wagering chip is pre-designated as a selected wagering chip but an indication of the wagering chip being a selected wagering chip is not output to a dealer and/or player unless and until the wagering chip is wagered or otherwise used in a qualifying action), the determination of the particular special functionality to be associated with the selected wagering chip (in embodiments in which a plurality of special functionalities are available) may similarly be made at the time the wagering chip is designated as a selected wagering chip.

Determining that a particular game element (e.g., an RFID-enabled wagering chip) should be designated as a selected game element could be based on any number of criteria. Some example and non-limiting criteria are described below. It should be noted that while some of the example criteria may be best suited for embodiments in which a designation of a game element as a selected game element is performed in real time as game elements are used in qualifying actions, other criteria may also be suitable for use in embodiments in which such designation is performed prior to the game element being used in a qualifying action (e.g., in a distinct process for designating game elements as selected game elements, separate from a process at a table which recognizes previously designated selected game elements). For example, in one embodiment an RNG or other algorithm for making such determinations on a random or pseudo-random basis may provide an output used to select game element as a selected game element. In another example in which game elements comprise wagering chips, such a determination may be performed such that after every predetermined number X of wagering chips wagered (e.g., at a particular table, in a particular session, in a particular area of the wagering establishment, within a particular time frame, or from an otherwise defined set of wagering chips) the next wagering chip wagered is designated as a selected wagering chip. In another example in which game elements comprise playing cards, a predetermined number of playing cards dealt at a table (e.g., from a particular deck, for a particular hand, at a particular table within a predetermined period of time or number of hands) may be selected on a random basis. In yet another example, a game element may be designated as a selected game element if it meets one or more predetermined conditions. In some embodiments, such one or more conditions may relate to factors external to the game element, such as factors relevant to a game event in which the game element is utilized (e.g., if the cards dealt for a game event on which a wagering chip is wagered match the last four (4) digits of the unique serial number of the wagering chip, the wagering chip is designated as a selected wagering chip).

Accordingly, in some embodiments a game element is not designated as a selected game element unless and until it is wagered or otherwise used in a qualifying action (as contrasted with other embodiments in which a game element is designated as a selected game element prior to being wagered or otherwise used in a qualifying action; noting that in such latter embodiments a player who possesses the game element may never reap the benefits of the special functionality of the selected game element if he/she does not wager or otherwise use the game element in a qualifying action).

FIG. 3B illustrates just one example mechanism for informing a player that one of the wagering chips he/she has wagered is a selected wagering chip, in embodiments in which a game element comprises a wagering chip. The wagering chip may be an RFID-enabled wagering chip and the electronic table may be an RFID-enabled table, or the wagering chip may be one that includes a code (e.g., machine readable code that is not discernable to humans) that is read by imaging technology of the electronic table. Irrespective of the type of technology utilized to read information from the wagering chip in order to identify the wagering chip as a selected wagering chip or to designate on the fly the wagering chip as a selected wagering chip (e.g., based on an algorithm that randomly selects wagering chips or due to a qualifying condition occurring), once the system determines that a wagering chip being used on the electronic table is a selected wagering chip corresponding to special functionality, the dealer and player associated with the wagering chip are informed of the fact that the wagering chip is a selected wagering chip (referred to as a "lucky chip") and the special functionality it corresponds to. In accordance with one embodiment, and as illustrated in FIG. 3B, a display of the electronic table 300 may be utilized to output a message to the player regarding the lucky chip and its special functionality.

Of course, other methodologies for outputting an indication to a player and/or dealer that a player has wagered a selected wagering chip or otherwise performed a qualifying action with a selected wagering chip may be utilized. For example, a dealer may be alerted via a dealer display and may verbally inform a player that his/her wagered chip is a selected wagering chip. In another example, a player's mobile device (e.g., a mobile telephone or tablet computer, or a dedicated wagering device) may be utilized to output to a player an indication or alert that a wagering chip the player has wagered is a selected wagering chip. For example, in some embodiments a player database may store a mobile telephone number, e-mail address or other contact information which allows the wagering establishment to communicate with the player while the player is wagering at the wagering establishment. In such embodiments, once it is determined that a wagering chip being wagered or otherwise used in a qualifying action is a selected wagering chip and that the player associated with the wagering chip qualifies to receive a benefit associated with the wagering chip (or potentially qualifies to receive a benefit associated with the wagering chip, such as if the player wins the current wager), the player identifier of the player associated with the wagering chip may be determined in real time (or substantially real time) and the contact information for that player may be retrieved from a record in a player database. The contact information may then be used to transmit am alert or message to the player. Such an alert or message may be, for example, text-based (e.g., a text or SMS (short message system) message), an e-mail message, an attachment to an e-mail message, a fax, an Instant Message (IM), a posting (or notification of a posting) to a website (e.g., a social networking site such as FACEBOOK or MYSPACE), a Multi-Media Message (MMS) or voice-based (e.g., a voice mail, audio or video file).

In one embodiment, a player may download a proprietary software application to his mobile device (an "app") or access a server device as a client via a mobile browser on the mobile device (in which embodiments the mobile device may be referred to as a "mobile client"), which may be available from the wagering establishment (or another entity, such as a manufacturer, designer or provider of the software for the RFID-enabled table systems or imaging technology table systems utilized in the wagering establishment). In such an embodiment, the player may allow such alerts to be provided to the player via the app. For example, the app may cause the mobile device on which it is downloaded to vibrate or output a particular audio signal when the player wagers a selected wagering chip or utilizes a selected playing card in his hand. For example, the system 100 of FIG. 1 may be operable to communicate with the player via such an app once the player downloads it to his mobile device or utilizes his mobile device as a mobile client to access such communications.

Figure 3C:
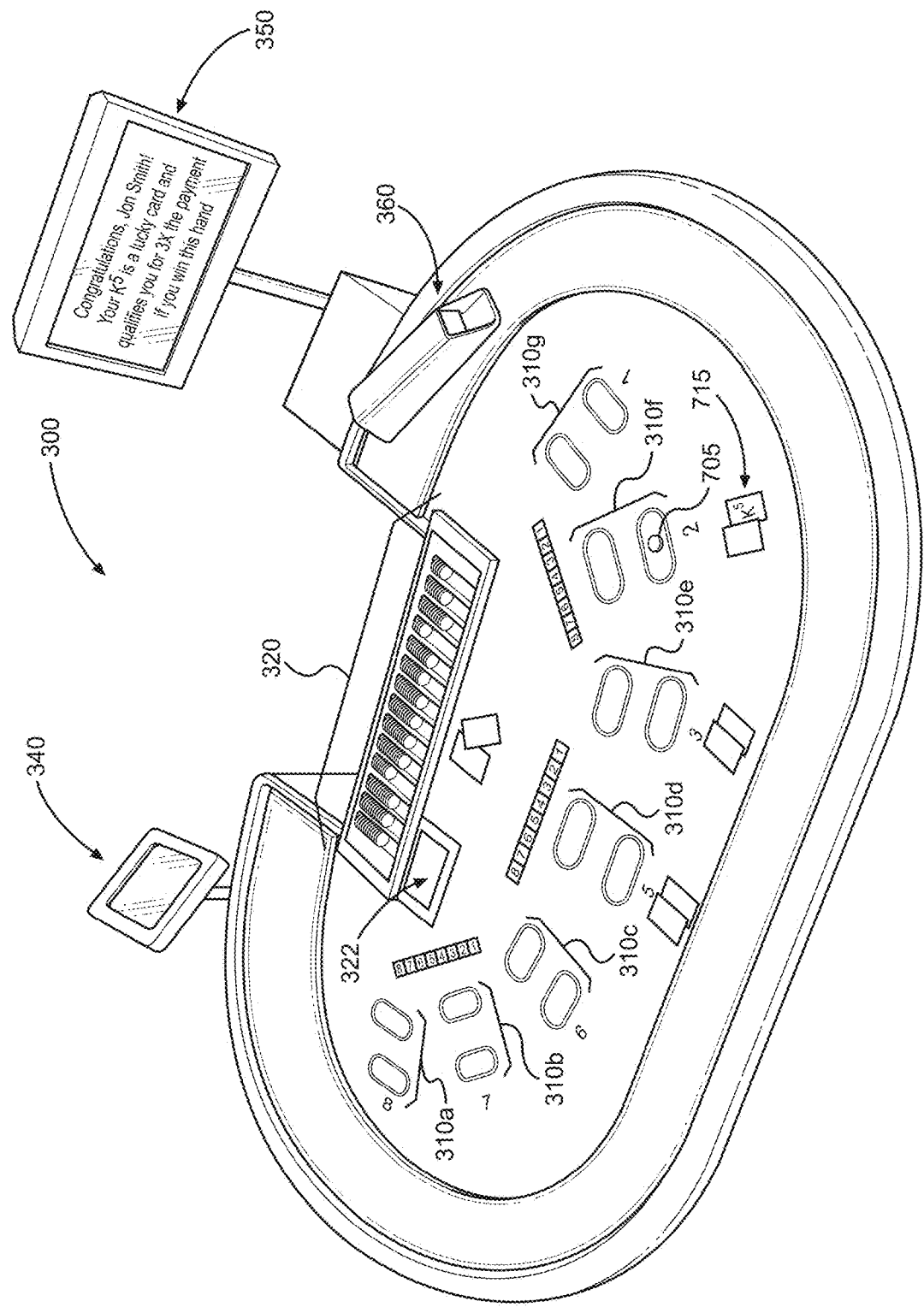
FIG. 3C illustrates a top planar view of a smart table for facilitating a baccarat game which is outputting another type of example indication to a player that a playing card dealt to the player qualifies as a selected game element, in accordance with some embodiments.

Referring now to FIG. 3C, illustrated therein is example mechanism for informing a player that one of the playing cards dealt to the player is a selected playing card, in embodiments in which a game element comprises a playing card. The playing card may be an RFID-enabled playing card and the electronic table may be an RFID-enabled table, or the playing card may be one that includes a code (e.g., machine readable code that is not discernable to humans) that is read by imaging technology of the electronic table. Irrespective of the type of technology utilized to read information from the playing card in order to identify the playing card as a selected playing card or to designate on the fly the playing card as a selected playing card (e.g., based on an algorithm that randomly selects playing cards or due to a qualifying condition occurring), once the system determines that a playing card dealt for a game on the electronic table is a selected game element corresponding to special functionality, the dealer and player associated with the playing card are informed of the fact that the playing card is a selected playing card (which may be referred to as a "lucky card") and the special functionality it corresponds to. In accordance with one embodiment, and as illustrated in FIG. 3C, a display of the electronic table 300 may be utilized to output a message to the player regarding the lucky card and its special functionality. In accordance with some embodiments, the message may identify the player (or, in some embodiments, the player position on which the selected playing card is located) and the particular card that is the selected playing card (e.g., in a manner recognizable to the player, such as by the suit and rank of the selected playing card).

Figure 3D:
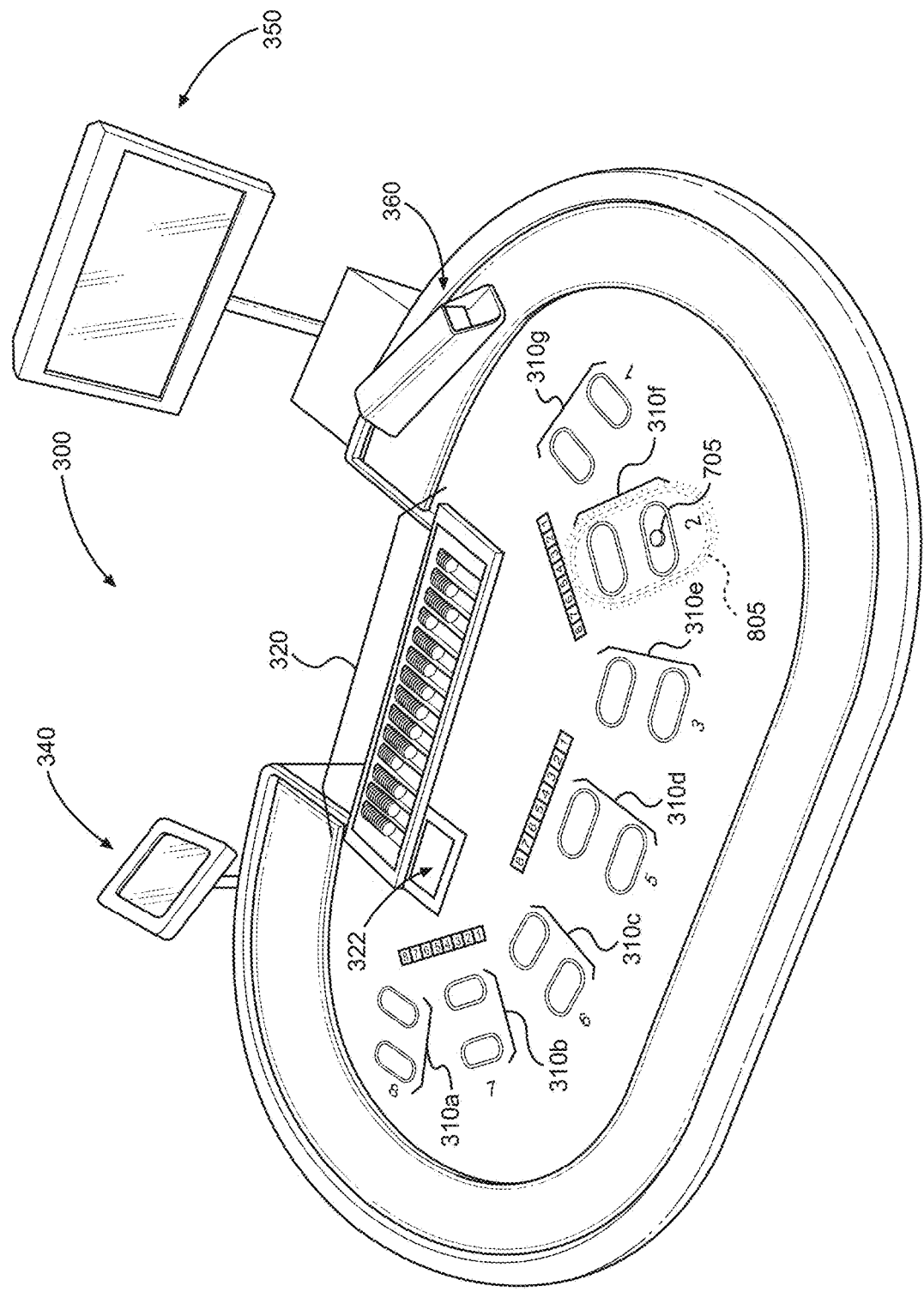
FIG. 3D illustrates a top planar view of a smart table for facilitating a baccarat game which is outputting one type of example indication to a player that a wagered RFID-enabled chip qualifies as a selected game element, in accordance with some embodiments.

In another example, FIG. 3D illustrates an embodiment in which lighting embedded under or within the felt of the table may be utilized to output an indication or message associated with a particular bet spot. In one embodiment, diffused LED lighting or electroluminescent lighting may be utilized to output an indication that a selected wagering chip or selected playing card has been detected at a particular player position or bet spot (in the example of FIG. 3D it is a wagering chip that is the selected game element but similar processes for communicating a detection of a selected game element may be utilized for playing cards). In FIG. 3D, an LED strip of light 805 is lit up when a selected game element 705 is detected at player position 310*f*. Although the LED strip 805 is illustrated as encompassing both bet spots (Player and Banker) at player position 310*f*, in other embodiments more directed LED lighting may be utilized to more particularly indicate the bet spot on which a selected chip is detected (e.g., distinct LED strips, lights or sets of lights may be utilized at the Player bet spot and the Banker bet spot of a particular player position). Although the embodiment of FIG. 3D illustrates an oval configuration of LED light(s), other configurations and types of lights may be used and the embodiments described herein are not limited to any particular configuration or types of lights for indicating a message to a player and/or dealer.

In some embodiments, different colored lights may be utilized to indicate different information to a player and/or dealer via lights near a particular bet spot or player position. For example, a first color may be utilized to indicate the highest bettor for a particular hand, a second color may be utilized to indicate that a selected chip has been detected at a particular player position, a third color may be utilized to indicate a winning player position, and a fourth color may be utilized to indicate a dead or unresponsive antenna at a particular player position. In one embodiment, a player position to which a dealer owes a payout amount may be lit and then turned off once the system determines that the dealer has correctly paid a payout to the player position. In accordance with some embodiments, a processor of a table (e.g., processor 484 of FIG. 4, described elsewhere herein) may be operable to direct one or more lights on the table to light up (and, in some embodiments, to light up in a particular manner or color) to indicate particular information to a player and/or dealer. Of course, other manners of differentiating among different messages output to a player and/or dealer via lights of the table may be utilized (other than color). For example, a solid light vs. a flashing light may be used to indicate different information.

As described herein, in some embodiments, an indication that a selected game element has been detected on a table (or detected as being used in a qualifying action on the table, such as by being wagered or utilized in a hand) may be output upon the selected game element having been detected by the system. The indication may be output in a manner which is visible to at least one of (i) the dealer of the table; (ii) the player who is associated with the selected game element (e.g., the player associated with the player position with which the selected game element is associated, such as the bet spot on which a wagering chip comprising the selected game element was placed); and (iii) all players wagering on game events at the table of which player position or bet spot. For example, as described with respect to FIGS. 3B and 3C, a message may be output via a display of the table. In another example, as described with respect to FIG. 3D, one or more lights or other indicators may be turned on in a manner that is recognized as an indicator of the presence of a selected game element. Of course other manners of indicating that a selected game element has been detected may be utilized and the embodiments described herein are not intended to be limiting. The indication, in some embodiments, may include an indication of the player, player position or other information corresponding to the detected selected game element which indicates which player has performed the qualifying action corresponding to the selected game element and will be awarded any benefits resulting from the special functionality corresponding to the selected game element. However, in some embodiments an indication that a selected game element has been detected on the table (e.g., as being used in a qualifying action for a current game event, such as being wagered on or utilized in a current hand) may be more general and may not initially indicate any information which indicates (at least to the players of the table, even if the dealer is informed) of the particular player who used the selected game element in the qualifying action and will thus be awarded the benefits resulting from the special functionality corresponding to the selected game element.

For example, to build anticipation among the players, an initial indication of a detection of a selected game element at a table as being used in a qualifying action on a game event may only generally indicate to the players that one of the players has wagered (or otherwise used in a qualifying action) a selected game element in a current game event. As the game event progresses towards resolution, a second or more specific indication may subsequently identify the particular player corresponding to the selected game element. For example, the more general indication may be output (i) before any cards have been dealt for the current hand, (ii) before all or a particular subset of cards have been dealt for the current hand, (iii) after some cards have been dealt but prior to any decisions being made available to the players with respect to the current game event, or (iv) after some cards have been dealt but prior to a final resolution of the current game event being output to the players. For example, if an indication of a selected game element comprising a wagering chip being present is output using lights (such as described with respect to FIG. 3D), when a selected wagering chip is first detected as having been placed at a bet spot (or otherwise being used in a qualifying action), the particular selected wagering chip (or particular player or bet spot corresponding to the detected selected chip) may not be indicated right away by lighting up one or more lights associated with the bet spot on which the selected wagering chip is detected; rather, the lights at each bet spot (or active bet spot or active player position) may be cycled through (the light(s) at each of such bet spots or player positions may be turned on and then off again in some sequence or pattern, or all the lights may be turned on) when the first card has been dealt for the current hand, to indicate to the participating players that a selected wagering chip has been detected as being wagered on the current hand. For example, in one embodiment the lights at each player position may initially be cycled through rapidly in a round robin fashion. As the hand progresses (e.g., as a second card is dealt for the hand), the round robin slows down or the lights start to otherwise blink more slowly, and slow down further when the third card dealt. Finally, the lights may stop on the one or more bet spots on which the selected wagering chip has been selected (i.e., only the bet spot or player position on which the selected wagering chip has been detected remains lit, to indicate the player or wager corresponding to the selected wagering chip).

Figure 4:
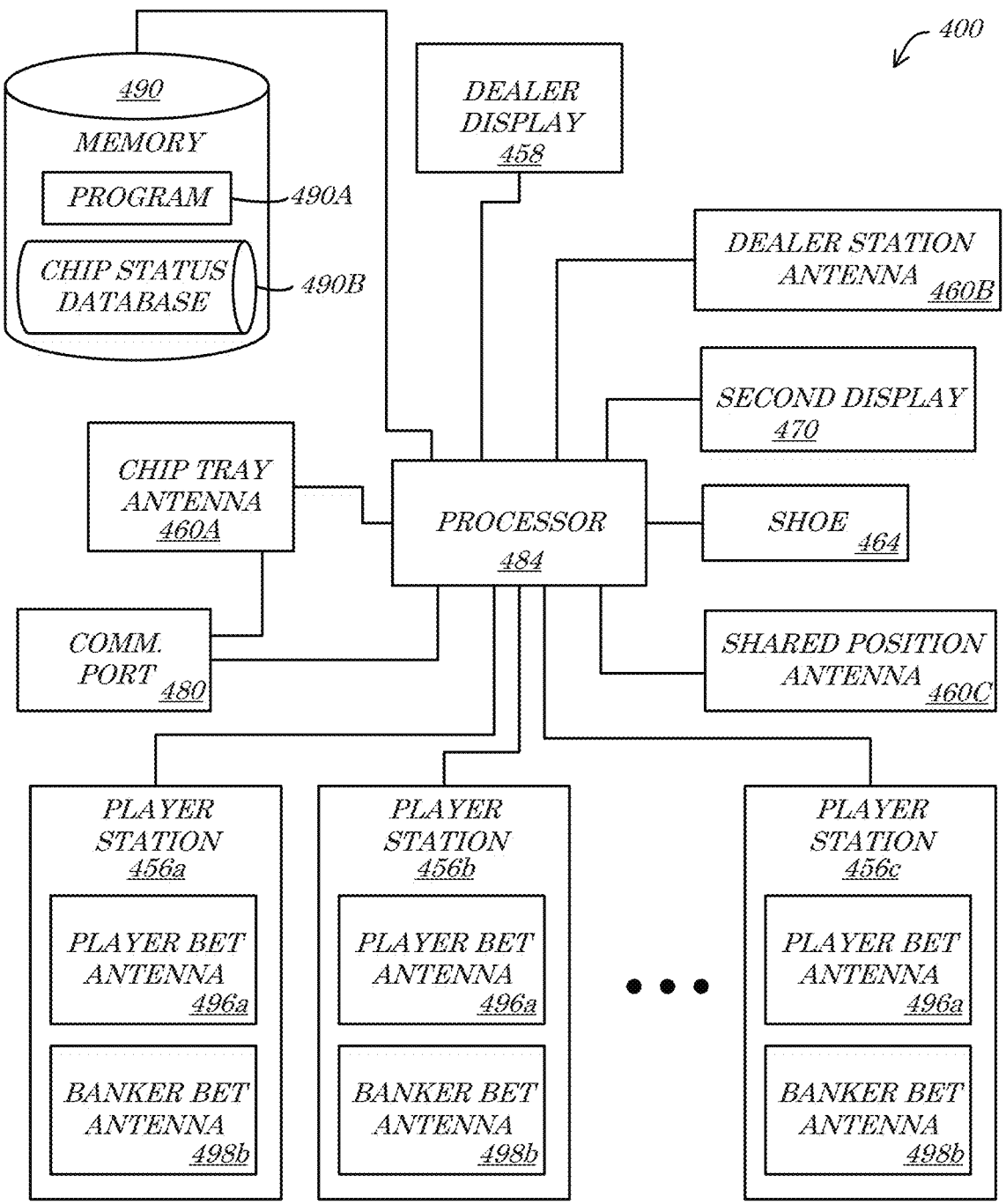
FIG. 4 illustrates a block diagram of a table system operable to facilitate at least some embodiments described herein.

Referring now to FIG. 4, illustrated therein is a block diagram of a table system 400 consistent with some embodiments described herein and which may be particularly useful in embodiments that utilize an RFID-enabled table. The table system 400 may comprise, for example, a table system 120 of FIG. 1. The table system 400 may be implemented as a system controller, a dedicated hardware circuit, an appropriately programmed computer which is a component or peripheral device of a table for facilitating a card game, or any other equivalent electronic, mechanical or electro-mechanical device.

The table system 400 comprises a processor 484, such as one or more INTEL® PENTIUM® processors. The processor 484 may be in communication with a memory 490 and a communications port 480 (e.g., for communicating with one or more other devices). The memory 490 may comprise an appropriate combination of magnetic, optical and/or semiconductor memory, and may include, for example, Random Access Memory (RAM), Read-Only Memory (ROM), a compact disc, tape drive, and/or a hard disk. The memory 490 may comprise or include any type of computer-readable medium. The processor 484 and the memory 490 may each be, for example: (i) located entirely within a single computer or other device; or (ii) connected to each other by a remote communication medium, such as a serial port cable, telephone line or radio frequency transceiver. In some embodiments, the table system 400 may comprise one or more devices that are connected to a remote server computer for maintaining databases.

The memory 490 may store a program 490A for controlling the processor 484. The processor 484 may perform instructions of the program 490A, and thereby operate in accordance with at least one embodiment described herein. The program 490A may be stored in a compressed, uncompiled and/or encrypted format. The program 490A may include program elements that may be necessary or desirable, such as an operating system, a database management system and "device drivers" for allowing the processor 484 to interface with computer peripheral devices (e.g., an RFID-enabled chip tray, an electronic shoe, a camera, an image capturing and/or processing device, any of which may provide data to the processor 484). Appropriate program elements are known to those skilled in the art, and need not be described in detail herein. In accordance with some embodiments, program 490A, a subroutine or module of program 490A or another program stored in memory 490 (or otherwise accessible to processor 484) may comprise instructions for applying at least some of the bonus or promotion functionalities described herein (e.g., designating certain game elements as selected game elements, identifying when a selected game element has been detected at a qualifying table, applying the special functionality of a selected game element to a result of a game event, outputting an indication to a player and/or dealer that a selected game element has been wagered or otherwise used in a qualifying action). Process 700 (FIG. 7) comprises an example of subroutines or processes that may be stored in memory 490, such as a part of program 490A.

The term "computer-readable medium" as used herein refers to any medium that participates in providing instructions to processor 305 (or any other processor of a device described herein) for execution. Such a medium may take many forms, including but not limited to, non-volatile media, volatile media, and transmission media. Non-volatile media include, for example, optical or magnetic disks, such as memory 490. Volatile media include dynamic random access memory (DRAM), which typically constitutes the main memory. Transmission media include coaxial cables, copper wire and fiber optics, including the wires that comprise a system bus coupled to the processor 484. Transmission media can also take the form of acoustic, electromagnetic, or light waves, such as those generated during radio frequency (RF), microwave, and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Various forms of computer readable media may be involved in carrying one or more sequences of one or more instructions to processor 484 (or any other processor of a device described herein) for execution. For example, the instructions may initially be borne on a magnetic disk of a remote computer. The remote computer can load the instructions into its dynamic memory and send the instructions over a telephone line using a modem. A modem local to a table system 400 may be operable to receive the data on the telephone line and use an infrared transmitter to convert the data to an infrared signal. An infrared detector can receive the data carried in the infrared signal and place the data on a system bus for processor 484. The system bus may carry the data to a main memory, from which processor 484 may retrieve data and execute instructions. The instructions received by main memory may optionally be stored in memory 490 either before or after execution by processor 484. In addition, instructions may be received via communication port 480 as electrical, electromagnetic or optical signals representing various types of information. According to some embodiments of the present invention, the instructions of the program 490A may be read into a main memory from another computer-readable medium, such from a ROM to RAM. Execution of sequences of the instructions in program 490A may cause processor 484 to perform at least some of the functions described herein. In alternate embodiments, hard-wired circuitry may be used in place of, or in combination with, software instructions for implementation of at least one embodiment described herein. Thus, embodiments described herein are not limited to any specific combination of hardware and software.

The memory 490 may also store at least one database, such as chip status database 490B. In some embodiments, some or all of the data described herein as being stored in the database 490B may be partially or wholly stored (in addition to or in lieu of being stored in the memory 490 of the table system 400) in a memory of one or more other devices, such the table game server 110 (FIG. 1). In accordance with some embodiments, the chip status database 490B may store chip identification data (e.g., denomination, unique chip identifier, chipset identifier, gaming establishment identifier, chip value, player identifier associated with chip identifier, validity of chip, chip status etc.) for one or more selected chips. An example of one embodiment of a chip status database 490B is illustrated and described herein with respect to FIG. 6. Although not illustrated as a separate figure, it should be understood that in embodiments in which a game element comprises a playing card, a similarly structured playing card status database may be stored (e.g., in memory 490) and utilized to store data defining one or more playing cards that have been designated as selected game elements (e.g., unique identifiers of such playing cards, one or more characteristics of such playing cards (e.g., suit and/or rank), status, card deck identifier, status, etc.).

The processor 484 is also operable to communicate with one or more display devices: (i) a dealer display 458 (e.g., one or more displays such as display 340 and/or display 322 of FIG. 3A) and a second display 470. The second display 470 may comprise, for example, a display for displaying historical outcomes or an indication that a selected game element has been detected at the table to players of the table. The dealer display 458 may output information such as (i) prompts for how much should be collected from players in commission or losing wagers (e.g., for each player position involved in the hand); (ii) prompts for how much should be paid out to players for winning wagers (e.g., for each player position involved in the hand and taking into account any special functionality associated with any wagering chips comprising selected game elements which have been detected at the table); and/or (iii) other information regarding a status of the game, including information regarding a status of one or more wagers or selected game elements being used on the table.

In some embodiments, one or both of the displays 458 and 470 may include or have associated therewith its own processor, memory and program (and may be operable to communicated data to and/or from the processor 484). Either of the display devices 458 and 470 may comprise, for example, one or more display screens or areas for outputting information related to game play on the gaming system, such as a cathode ray tube (CRT) monitor, liquid crystal display (LCD) screen, or light emitting diode (LED) screen. In some embodiments, either of the display devices 458 and 470 may comprise a touch screen.

As described herein, in some embodiments an RFID-enabled chip tray may comprise one or more antennas for reading information from RFID-enabled chips placed in the chip tray. In such embodiments, the processor 484 is further operable to communicate with the one or more chip tray antenna(s) 460A. The one or more antenna(s) 460A may be operable to read data from one or more chips placed within a chip tray (e.g., chip identifier, chip set identifier, chip denomination, etc.) and transmit this information to the processor 484.

The processor 484 is further operable to communicate with a shared position antenna 460C, which comprises at least one antenna on a shared or common betting area for recognizing chips placed (and removed from) the shared or common betting area. In some embodiments, the processor may receive from an antenna 460 data regarding chips placed on a common betting area and determine, based on this data and additional data stored in memory (e.g., a player identifier or last player position associated with the chip that has now been acquired at the shared position antenna 460C) that a particular bet has been made by a particular player or for a particular player position and to determine whether any such chip is a selected chip. Of course, a shared position antenna or shared or common betting area is not necessary for all embodiments and the systems and processes described herein are not limited to tables which include shared or common betting areas.

The processor 484 is further operable to communicate with a plurality of antennas at player positions placed on the table. As described with respect to FIGS. 2 and 3A-3D, in some embodiments each player position of a table may have a corresponding Player bet area and a Banker bet area and each such area may have associated therewith its own antenna for determining that a wagering chip has been placed within its area. In embodiments utilizing RFID-enabled playing cards, an antenna may also be operable to read or detect information from an RFID-enabled playing card positioned within its range. The table system 400 illustrates three player positions 456 (456*a*, 456*b* and 456*c*) as each having two antennas associated therewith: a player bet antenna 496*a* and a banker bet antenna 498*b*. Each such antenna may be uniquely identifiable by, for example, (i) a unique identifier associated therewith, and (ii) an identification of a port or other component of the table associated with the antenna (e.g., the port into which the antenna is plugged into may have a unique identifier associated therewith) and such unique antenna identifier may be transmitted to or recognized by the processor 484 when game element information regarding a game element acquired by a respective antenna is transmitted to the processor 484, such that the processor 484 may be programmed to determine (i) which player position and which betting area within the player position the game element has been placed within; and (ii) whether any such game element is a selected game element. In some embodiments, a single player station 456 may include interrogators associated with two or more players. For example, one interrogator may be intended for a first player playing the game at the table and another interrogator for a second player (e.g., a "back bettor") who may be betting along with or in association with the first player, either remotely or from essentially the same location, but whose game elements and betting activity is to be separately tracked. In some embodiments, the chip status database 490B (or a similar playing card status database, for embodiments in which game elements comprise playing cards) may store detailed data with information regarding game elements which have been identified (e.g., by a remote server device) as selected game elements and utilize the information in this database to determine whether any of the game elements detected at the table comprise selected game elements identified in the database.

The processor 484 is further operable to communicate with an electronic shoe 464. The shoe 464 may be an intelligent shoe such as the IS-T1™ and IS-B1™ or the MD1, MD2 sold by SHUFFLE MASTER or other such devices. The shoe 464 may be able to determine which cards are being dealt to which player station, through RFID technology, image recognition, a printed code on the card (such as a barcode), or the like. The embodiments described herein are not dependent on any particular technique used to recognize cards dealt in a card game (or cards remaining as available to be dealt). Further information about intelligent shoes may be found in U.S. Pat. Nos. 5,941,769 and 7,029,009, both of which are incorporated by reference in their entireties and U.S. Patent Application Publications 2005/0026681; 2001/7862227; 2005/0051955; 2005/0113166; 2005/0219200; 2004/0207156; and 2005/0062226 all of which are incorporated by reference in their entireties. In place of or in addition to an intelligent shoe, cameras (e.g., such as may be used with pattern recognition software) may be utilized to detect what cards have been dealt to what player stations and what chips have been wagered at particular player stations. One method for reading data from playing cards at table games is taught by German Patent Application No. P44 39 502.7. Other methods are taught by U.S. Patent Application Publication 2007/0052167 both of which are incorporated by reference in their entirety.

In some embodiments, the table 400 may comprise an electronic table in which virtual representations of cards are dealt rather than physical cards. In such embodiments, an electronic shoe may not be desired and each player station may include a respective electronic display for displaying the electronic cards dealt to a player.

The processor 484 is further operable to communicate with a dealer station antenna 460B, which comprises one or more antennas placed in a dealer area of the corresponding table. The dealer station antenna 460B may be operable to detect RFID-enabled game elements (e.g., wagering chips) which have been placed within its acquisition area, such as chips the dealer places in the area for recognizing by the system prior to placing them into the dealer tray or paying them to a player or playing card dealt to a dealer hand.

The processor 484 may, in some embodiments, be operable to (i) receive the data read from game elements via at least one of the RFID antennas on the table 400, (ii) determine based on the data whether a game element is a selected game element (e.g., by comparing a game element identifier received from an antenna to game element identifiers of selected game elements as stored in the chip status database 490B or a playing card status database) and (iii) output an alert or message if a game element utilized on the table (or otherwise involved in a qualifying action) is determined to be a selected game element. The alert or message may be output, for example, via dealer display 458 and/or second display 470. For example, the processor 484 may receive data from at least one of (i) at least one of the antennas 496*a* and 498*b* located within a player station 456*a*, 456*b* or 456*c* (e.g., an indication of chips placed as wagers), (ii) a shared position antenna 460C, and (iii) dealer station antenna 460B. Based on such received data, the processor 484 (e.g., in accordance with the program 490A) may determine that a game element detected at one of these antennas is a selected game element.

In one embodiment game elements include their own electronic memories and a memory of a game element may store an indication that a game element is a selected game element. This information may be stored in the memory of the game element when the game element is first provided to the player (e.g., when a wagering chip comprising a game element is provided to a player at a casino cage or the player otherwise receives the chip). In another embodiment, a processor of a game element (in embodiments in which game elements include their own processors) may receive an indication that the game element has been chosen as a selected game element (e.g., after the game element has been provided to the player by the casino, such as by receiving this information via Wi-Fi or from a processor of a table when the game element is within range of a table or other device operable to transmit such information to the game element). In such embodiments, the processor 484 may be operable to receive from the selected game element itself (or read from a memory of the selected game element that is accessible to or readable by the processor 484) an indication that the game element is a selected game element. The processor 484 may, in some embodiments, similarly determine the special function associated with the selected game element based on an indication of the special function as stored in the memory of the selected game element.

According to some embodiments, game elements placed on an electronic table or on specially designated areas of the electronic table (e.g., on bet spots or other areas of player positions) may be periodically (e.g. once every 0.5 seconds) interrogated or analyzed (e.g., by the RFID sensors or by an optical imaging component of a table system) in order to whether a game element being utilized in a game event or transaction is a selected game element. In another embodiment, game elements may be interrogated or analyzed whenever they are placed in certain designated areas of the electronic table (e.g. individual player position bet spots or a common betting area bet spot) or as they are provided to a player (e.g., playing cards may be analyzed as they are dealt from a shoe). In yet another embodiment, game elements placed on an electronic table (or within certain areas of the electronic table) may be interrogated or analyzed on demand or in response to one or more qualifying conditions being satisfied (e.g., in response to a command or input from a dealer or other casino personnel or upon another qualifying event occurring). In some embodiments, game elements placed on qualifying tables (e.g., RFID-enabled tables or specially designated tables) may be interrogated or analyzed upon a random "lucky chip" bonus signal being received from a remote server device. For example, in some embodiments, an algorithm may be used to trigger a "lucky chip" bonus time at certain tables, upon the occurrence of which all chips being wagered on those tables are (i) made available as candidates for being designated as selected chips; and/or (ii) analyzed to determine whether any of them are selected chips or have previously been designated as selected chips. For example, in some embodiments, a "lucky chip bonus" may be triggered at a table (i.e., one or more chips being wagered on the table may be designated as a selected chip) if certain conditions are satisfied at the table (e.g., if enrollment at a table reaches a threshold value, if a win/loss value or a total wagered value reaches a threshold value or if a rolling chip turnover value reaches a threshold value). Similar processes may be implemented for triggering a "lucky card" features such that one or more playing cards is selected as a lucky card upon the occurrence of a triggering event or alert to the system. Of course in other embodiments, designation, selection and/or activation of selected game elements is not table-specific but rather applies to a plurality of qualifying tables in a given casino.

Figure 5:
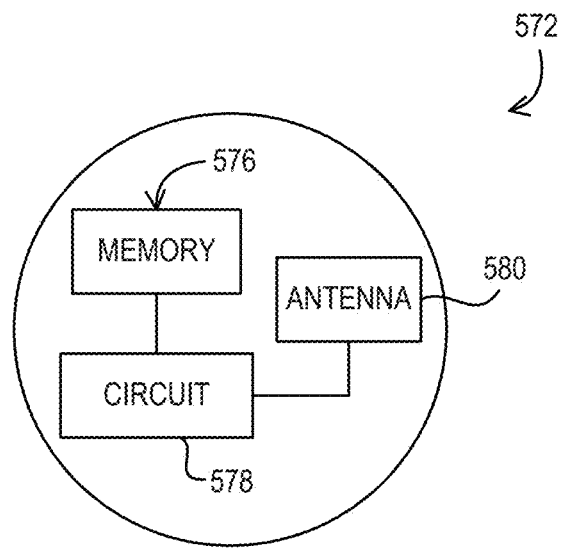
FIG. 5 illustrates a diagram of an RFID-enabled chip, in accordance with some embodiments.

Turning now to FIG. 5, illustrated therein is a schematic diagram of an example RFID-enabled chip 500, which may be used in at least some embodiments in which a game element comprises an RFID-enabled chip. In accordance with some embodiments, the RFID-enabled chip 500 may include (i) an RFID tag or memory 576; (ii) an electronic circuit or processor 578; and (iii) an antenna 580. An RFID-enabled chip usable in at least some embodiments may be similar or identical to those disclosed in U.S. Pat. Nos. 5,166,502; 5,676,376; 6,021,949; and 6,296,190, and U.S. Patent Application Publication Nos. 2004/0207156 and 2004/0219982 which are all incorporated by reference in their entireties. No particular type of RFID-enabled chip is required for the embodiments described herein, so long as the chip can support the functionality described with respect thereto. In some embodiments, each chip may store in its memory (and communicate to an antenna of a table as described herein) at least one of (i) a unique serial number, (ii) a chipset identifier, (iii) an associated player identifier, (iv) an indication of a denomination of the chip, and (v) other information. The gaming establishment (e.g., casino) or other entity may associate values, categories, denominations or other values with each serial number. The association may be in a look-up table or the like. Alternatively, the unique identifier of a given chip may be encoded to include information therein. Likewise, a chip may be color-coded or include other indicia that indicates a value or other information to the player or dealer. In some embodiments, plaques may be used instead of chips (e.g., for exceedingly large denominations).

The RFID-enabled chip 500 does not include a battery or power source and may thus be referred to as a passive chip which obtains energy from the antenna or interrogator which reads information therefrom, consistent with some embodiments. In accordance with some embodiments, an interrogator or antenna of a table (e.g., an antenna of the set of antennas 210a and/or an antenna 220A of a chip tray) may send out an electromagnetic signal that interacts with the antenna of an RFID-enabled chip, exciting a current within electronic circuit of the chip. In response to the excited current, the electronic circuit of the chip may cause the antenna of the chip to emit a second electromagnetic signal as a response, which is received by the interrogator or antenna of the table which had sent out the electromagnetic signal. The second signal may comprise identifying information about the chip such that the interrogator can identify the chip on receipt of the second signal. The second signal may be generated passively or actively. That is, in a first embodiment, the energy from the interrogation signal provides sufficient power for the electronic circuit of the chip to use to send the second signal. In a second embodiment, the electronic circuit of the chip may include a battery or other power source, which is used to power the generation of the second signal. In other embodiments, an RFID-enabled chip may be an active chip which includes its own battery or power source.

In one embodiment, an electronic circuit and antenna of a given chip may act as a transponder capable of responding to an interrogator or antenna of the table (e.g., an antenna of an RFID-enabled chip tray of the table). The interrogator or antenna may be a sensor or other component operable to detect, recognize, determine, identify or sense the presence (or absence) of an RFID-enabled chip. The interrogator or antenna may also be operable to detect, determine, identify, recognize or receive various information about a chip (e.g., chip identifier, chip set identifier, chip denomination, chip status, etc.). The interrogator or antenna of a table or chip tray may also be operable to transmit information to one or more processors or memories (e.g., information regarding the presence or absence of a chip in a certain location, an identifier of a chip, etc.). Such one or more processors or memories may be components of (i) a table, (ii) a component of a table (e.g., of a dealer display or chip tray) and/or (iii) a server device operable to communicate with one or more tables. In accordance with some embodiments, such one or more processors may also have access to a memory which stores a database defining one or more selected chips (e.g., such as the one illustrated in FIG. 6 and described elsewhere herein). For example, a table may include a processor and a memory storing such a database (which database, in some embodiments, may be updated based on data received from one or more remote servers, such as a table game server 110 (FIG. 1). The processor of the table may be operable to compare a chip identifier of each chip detected in a wagering position of the table (or otherwise used in a manner which may comprise a qualifying action for a selected chip) to the chip identifiers of such a database to determine whether a chip being wagered on the table is a selected chip. In other embodiments, a processor of a table may be operable to transmit information defining one or more chips placed in one or more wagering positions of the table (or otherwise used in a manner which may comprise a qualifying action for a selected chip) to second processor of another computing device (e.g., a processor of a remote server device, such as table game server 110) for a determination of whether a chip detected on the table is a selected chip. In other embodiments, the memory 576 of a chip itself may store an indication of whether the chip is a selected chip. This indication may then be transmitted or communicated to an antenna of a table during certain qualifying times (e.g., when an antenna interrogates the chip upon it being placed within a betting area of the table, upon a "lucky chip" bonus time being triggered, etc.).

In embodiments in which a game element comprises an RFID-enabled playing cards, similar components, processes and data may be implemented with respect to a playing card. For example, a playing card may include (i) an RFID tag or memory 576; (ii) an electronic circuit or processor 578; and (iii) an antenna 580 and store data identifying the playing card (e.g., a unique identifier, a deck identifier, a rank and suit of the card, etc.) that may allow it to be utilized to implement the promotions and special functionalities described above with respect to an RFID-enabled wagering chip.

Turning now to FIG. 6, illustrated therein is table 600 which comprises an example embodiment of a chip status database 490B (FIG. 4), which is applicable in embodiments in which game elements comprise wagering chips. Table 600 defines chips which have been chosen or designated as selected chips (i.e., chips which have been designated to correspond to a special award or special functionality when they are utilized in a qualifying action, such as when they are wagered). For example, in accordance with one embodiment a server device (e.g., table game server 110 of system 100 as illustrated in FIG. 1), a processor of one or more table systems or another device may, in accordance with a game element selection program, select one or more game elements to be (i) associated with special functionality the game elements would not otherwise be associated with; (ii) activated such that special functionality associated with the game elements is activated such that the special functionality is to be applied to a game event upon the selected game elements being utilized in a qualifying action. In accordance with some embodiments, such a game element selection program may be stored in a memory of a table game server 110, a table system 120 or another device (e.g., a computing device at a casino cage via which players may purchase wagering chips such as RFID-enabled gaming chips). In one embodiment, a game element selection program may be a sub-routine of program 490A (FIG. 4) or another program stored in memory 490 (FIG. 4).

The game element selection program may select game elements, for example, in accordance with a random or pseudo-random process. In another embodiment, the game element selection process may not be random or pseudo-random but may instead select game elements upon one or more triggering conditions being satisfied (e.g., each $100^{th}$ chip purchased from a casino cage may be selected for special functionality, each time a payout (or sum of payouts) equaling at least a predetermined amount is won by one or more players a chip may be selected for special functionality, each time a playing card is dealt at a table which has an average player win below a predetermined threshold, etc.).

In accordance with some embodiments in which game elements comprise wagering chips, a specified subset of chips from a particular chipset are selected to be associated with special functionality. For example, in one embodiment the system may randomly selected X number of RFID-enabled chips from a particular chipset (and, in some embodiments, from chips of a particular denomination in a particular chipset). Of course many other criteria may be applied to find a set of chips from which selected chips are selected. For example, chips may be filtered to define a group of chips from which selected chips are chosen based on at least one of (i) promotion associated with the chips; (ii) a time frame within which the chips were purchased or won; (iii) a current status of the chips; and (iv) a current location of the chips.

Table 600 illustrates one embodiment in which a plurality of chips comprising a subset of RFID-enabled chips from a particular chipset (as identified in field 602) was chosen as selected chips. The unique identifiers (e.g., unique serial numbers of the chips) of the selected chips are stored in the table (as identified in field 604). Of course in other embodiments selected chips from different chip sets may be similarly identified and stored. The selected chips comprise chips of different denominations, as indicated in field 606. Each selected chip has stored in association therewith a chip status (as indicated in field 608) and an associated player identifier (as indicated in field 610). The chip status indicates a current status of the corresponding chip: an indication of "active" may indicate that the chip is currently in play by a player of a table game, an indication of "inactive" may indicate that the chip is currently not in play by a player (e.g., the player has not placed the chip on a table as available for wagering or wagered the chip) and an indication of "house" may indicate that the chip has been lost by the player in a wager and is now in the possession of the casino. Of course the chip statuses indicated in table 600 are exemplary only and many other statuses may be utilized within the scope of the embodiments described herein. The associated player identifier may indicate the player identifier of the player who is currently associated with the chip. In some embodiments it may be a player position or bet spot that is associated with a given selected chip, in addition to or in lieu of a player identifier.

Of course other data defining a selected chip may also be stored. For example, the benefit to be provided to a player associated with a particular selected chip or the special functionality corresponding to a particular selected chip may be stored in a record defining a particular selected chip. As described, in some embodiments all selected chips may be associated with the same special functionality or corresponding benefit (e.g., all payouts are tripled if a player wagers with a selected chip). In such embodiments, it may not be necessary or desirable to store the special functionality or benefit corresponding to the selected chips. In other embodiments, however, different selected chips may be associated with different special functionalities. In such latter embodiments, it may be desirable to store the particular special functionality associated with a particular selected chip. In some embodiments, the process of selecting a selected chip may also include a step of selecting and assigning the special functionality to be associated with the chips selected in accordance with the process. In other embodiments, a particular special functionality or promotion may be selected (e.g., by casino personnel) for all chips selected (e.g., randomly or pseudo-randomly) when the chip selection process is triggered.

In another example of additional data which may be stored in a chip status database (or a playing card database, in embodiments in which game elements comprise playing cards) such as that illustrated in table 600, in some embodiments a selected game element may be associated with one or more qualifying actions which define a condition which must be satisfied in order for a player to receive a benefit associated with a promotion, award or other special functionality corresponding to a particular selected game element. In some embodiments, the same qualifying action may be associated with all selected game elements. For example, in embodiments in which game elements comprise wagering chips the qualifying action may be a requirement that the selected chip needs to be wagered at a qualifying electronic table. In another example, in embodiments in which game elements comprise playing cards the qualifying action may be a requirement that the selected playing card be dealt to a player and not discarded by the player when building his final hand. Accordingly, in some embodiments it may not be necessary or desirable to store an indication of the qualifying action in association with each selected game element (e.g., a program for applying the special functionality of a selected game element may include one or more steps for verifying that the qualifying action has been satisfied prior to applying the special functionality to a game event or transaction). However, in other embodiments, different qualifying actions may be associated with different selected game elements and thus it may be desirable to store the particular qualifying action associated with a particular selected game elements in a record defining the selected game element.

In some embodiments, a qualifying action (whether applied to all selected game element or only some selected game elements) may be that the selected game element be utilized in a game event (or a particular qualifying game event or type of game event, such as a game event on which a minimum wager is placed) by a qualifying player. A qualifying player may comprise, for example, a player associated with a particular rating, category or status. Thus, in some embodiments, even if a selected game element is used in a qualifying action on a game event (e.g., the selected game element is wagered on a table game of a qualifying electronic table), the special functionality of the selected game element may not be applied to the game event (e.g., the multiplier defined by the special functionality may not be applied to a payout if the player wins the game event in which the game element is utilized) if the player who uses the selected game element in the qualifying action is not a qualifying player (e.g., is not a rated player). In some embodiments, the players at the table on which the selected game element is utilized may not event be informed that a selected game element has been detected at the table if the selected game element is not used in a qualifying action and/or is not used by a qualifying player. In other embodiments, the players and/or dealer may be informed that a selected game element has been detected and also may be informed why the special functionality of the selected game element was not applied to the game event.

In accordance with some embodiments, data defining one or more selected game elements may be stored in a database such as that illustrated in table 600 (or a similar one for game elements comprising playing cards) in an encrypted or otherwise protected form, to prevent or minimize the chances that the data may be tampered with.

In some embodiments, the system (e.g., a system such as system 100 of FIG. 1) may be operable to compare the identifiers of game elements detected at one or more table systems (or identifiers of game elements detected as being utilized at one or more table systems) to the identifiers of the game elements in a database of selected game elements to determine whether a detected game element is a selected game element. In some embodiments, once a selected game element has been detected and applied, the identifier of the selected game element may be removed from such a database or the status of the game element may be changed such that the special functionality of the game element is not applied again in a subsequent game event. In some embodiments, the special functionality of a selected game element may be applied in more than one game event (e.g., a predetermined plurality of times or until a status of the selected game element changes such that it is no longer categorized as a selected game element). In some embodiments, a selected game element may remain a selected game element only for a predetermined period of time (e.g., one day, four hours, etc.). If the selected game element is not used in a qualifying action before the predetermined period of time ends, the special functionality of the selected game element may never be applied (e.g., the special functionality of the game element may effectively expire at some predetermined time).

In some embodiments, a gaming establishment may utilize some of the processes described herein (or similar processes) to set or modify a special function, status or category with a particular game element and/or with a game element corresponding to a particular characteristic (e.g., a wagering chip from a particular chipset, a playing card having a particular rank or from a particular deck, etc.). For example, a gaming establishment may designate, on a game element by game element basis, that a status or functionality of a particular game element comprising a wagering chip that was previously designated as a cashable chip to be changed to non-cashable (e.g., at the time casino personnel or the system makes the change or once a specified condition is satisfied). For example, in one scenarios a set of chips (or a particular chip), when sold or provided to a player at the cage or table, may be designated as non-cashable or promotional (e.g., it must be played at a table and is non-cashable) until a particular condition is satisfied. For example, the status of the chip(s) is changed to cashable once it/they are wagered a predetermined number of times, even if that predetermined number is one. Another example of a condition that, once satisfied, may cause a change in a status or functionality associated with a chip is if the chip is considered lost. In such embodiments, in response to a player attempting to cash out a chip that is designated non-cashable in the system, the system may output a message to the cashier, dealer, other casino personnel or kiosk at which the player is attempting to cash in the chip, indicating that the chip can only be wagered at this time but not cashed in (and decline to cash in the chip).

In another example embodiment, a junket chip may have a status or special functionality associated with it (e.g., it may be designated as non-cashable in a database or other memory of the system) and have other information, such as a junket identifier, associated with it. In some embodiments, having a junket identifier associated with a chip may further restrict the usage or functionality of the chip. For example, the chip may only be wagerable or playable at specific tables operated by, or associated with, the identified junket.

Figure 7:
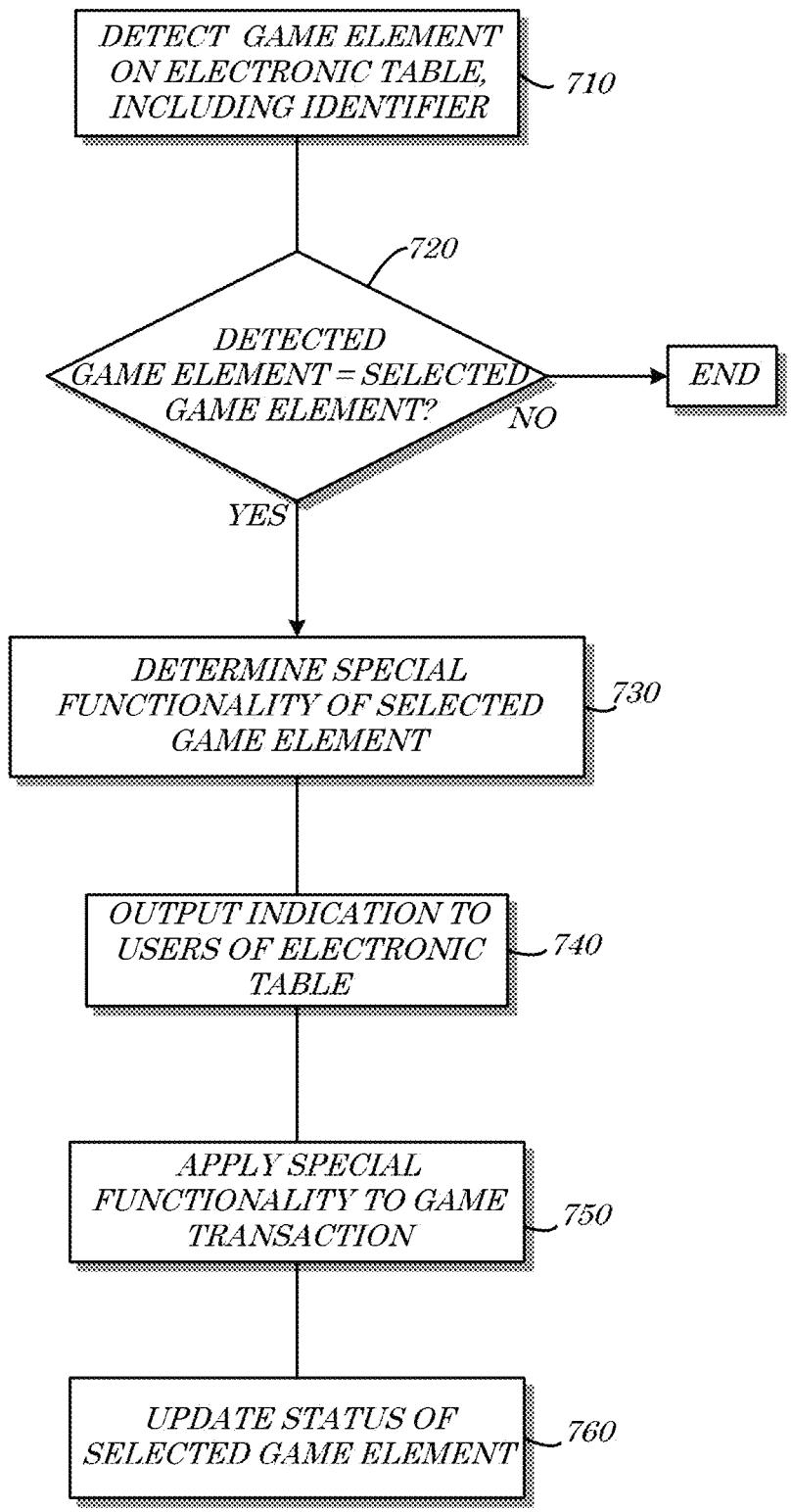
FIG. 7 illustrates a flowchart comprising an example process consistent with at least some embodiments described herein.

Turning now to FIG. 7, illustrated therein is an example process 700 which is consistent with some embodiments described herein. Process 700 may be performed, for example, by at least one of a server device operable to facilitate an electronic baccarat game and/or a player device enabling a player to play the electronic baccarat game. For example, process 700 may be performed by at least one of a table system device 120 (FIG. 1), a table game server 110 (FIG. 1), a table 300 (FIGS. 3A-3D) and a table system 400 (FIG. 4). It should be noted that additional and/or different steps may be added to those depicted and that not all steps depicted are necessary to any embodiment described herein. Process 700 is an example process of how some embodiments described herein may be implemented, and should not be taken in a limiting fashion. A person of ordinary skill in the art, upon contemplation of the embodiments described herein, may make various modifications to process 700 without departing from the spirit and scope of the embodiments in the possession of applicant.

Process 700 begins when a game element is detected on an electronic table, including a recognition of the game element's identifier (step 710). The game element may be, for example, a wagering chip or a playing card. In one embodiment the identifier may be a unique identifier that uniquely identifies the game element. In another embodiment, the identifier may be one that identifies (or may be used to identify) a characteristic or category of the identifier (e.g., a deck rank or suit of a playing card, a chip set identifier, denomination or type of a wagering chip). In one embodiment detecting the game element may comprise detecting it via RFID technology (e.g., based on a reading of data from an RFID-enabled wagering chip or an RFID-enabled playing card by an RFID interrogator or antenna of an electronic table). In another embodiment detecting the game element may comprise detecting it via optical imaging technology (e.g., having an imaging component of an electronic table read a bar code or stack code of a wagering chip or playing card). In one embodiment the detecting may be responsive to a triggering event (e.g., a qualifying action or activity on the electronic table is detected, such as a dealing or preparing to deal a playing card by an electronic shoe or a placement of a wagering chip on a bet spot). In another embodiment the detecting may be during a periodic or continual (or substantially continual) scan of certain areas or events of the electronic table.

Once a game element is detected, it is determined whether the detected game element is a selected game element (step 720). Determining whether a detected game element is a selected game element may be performed by at least one of a processor of the electronic table on which it was detected, a processor of a component of such a table or a processor of a server in communication with the table.

In one embodiment, determining whether a detected game element is a selected game element may comprise applying an algorithm or selection process to that game element (or a plurality of game elements detected on the electronic table) to determine whether it (or any of them) are to be considered selected game elements. This embodiment, as described herein, may comprise a dynamic ad hoc selection of selected game elements. In some embodiments, one or more factors specific to the detected game element may be utilized in a dynamic determination of whether it should be designated as a selected game element. For example, an identifier of a player associated with the game element may be utilized to retrieve or determine information about the player (e.g., a category or rating, an average wager, a rate of play, a win percentage or profile, a last win, demographic information, etc.). In another example, information about a game session at the electronic table (e.g., how many times within the last X number of hands players have won hands, an average payout to players at the table within the last X number of hands, a number of players participating in the game, a rate of play or wagering at the table, a win percentage for the table, how long it has been since a game element at the table has been designated as a selected game element, etc.). In yet another example, information external to the game, electronic table or player may be information related to the current day, time and/or gaming establishment (e.g., how many game elements have been designated as selected game elements within the last hour or day; a number of active players at the gaming establishment; a level of gaming activity at the gaming establishment; whether the current time is a peak gaming time at the gaming establishment, etc.).

In another embodiment, determining whether the detected game element is a selected game element may comprise retrieving such information from memory (e.g., from a table stored in a memory of a computing device, such as a memory of the electronic table or a memory of a server device). For example, in one embodiment a status or designation of a game element may be determined based on a unique identifier of the game element and/or another characteristic of the game element. In one particular example in which the game element comprises a wagering chip, a chip status database such as chip status database 600 may be consulted to determine whether the detected game element is a selected game element.

If it is determined, in step 720, that the detected game element is not a selected game element, then process 700 ends and game play may continue in a conventional manner. If, on the other hand, it is determined that the detected game element is a selected game element then process 700 continues to step 730.

Assuming, in accordance with some embodiments, that more than one special functionality is available in the system as possibly being associated with the selected game element, in step 730 the particular special functionality associated with the selected game element is determined. As described with respect to step 720, the special functionality may be determined ad hoc (e.g., an algorithm or process may be applied at the time, or essentially the time, that the game element is determined to be a selected game element, to select the special functionality to associate with the game element). In other embodiments, the special functionality may have previously been associated with the selected game element and may be retrieved from a database or other memory scheme (as described earlier herein). The different special functionalities that may be associated with game elements (e.g., multipliers, additional payouts or bonuses, special game choices, etc.) were described earlier herein and will not be repeated for purposes of brevity.

Once the special functionality associated with the selected game element is identified, it is applied to a transaction or game event in step 740. For example, depending on the particular special functionality that is associated with the selected game element, applying the special functionality may comprise performing at least one of the following: (i) applying a multiplier to a payout won as a result of use of the selected game element in a winning hand of a card game (e.g., a 2×-10× multiplier); (ii) selecting a probability and/or payouts structure more favorable to the player than would otherwise be utilized to determine a result of a game event in which the selected game element is utilized; (iii) modifying at least one rule of a game for determining results of the game (e.g., the player may switch sides in a baccarat game or take an extra card) for a game element in which the selected game element is utilized; (iv) automatically providing to the player an award or prize (whether monetary or non-monetary), in some embodiments irrespective of whether the player wins the game event in which the selected game element is utilized; (v) automatically qualifying or upgrading the player for a level, stage, phase or aspect of the game the player would not otherwise qualify for; and (vi) entering the player into a raffle, drawing or other promotion.

In some embodiments, as described in more detail herein, a qualifying action may need to be performed (e.g., by a player associated with a selected game element, such as a player who comes to possess the selected game element) in order for the promotion, award or other special functionality to be applied to a game event (e.g., the selected game element comprising a wagering chip may be required to first be wagered on a game event, on a game event within a specified time frame, as part of a minimum total wager amount, on a particular table or type of table, on a particular game or type of game, etc.). In some embodiments, a qualifying action (whether applied to all selected game element or only some selected game elements) may be that the selected game element be utilized in a game event (or a particular qualifying game event or type of game event, such as a game event on which a minimum wager is placed) by a qualifying player. A qualifying player may comprise, for example, a player associated with a particular rating, category or status. Thus, in some embodiments, even if a selected game element is used in a qualifying action on a game event (e.g., the selected game element is wagered on a table game of a qualifying electronic table), the special functionality of the selected game element may not be applied to the game event (e.g., the multiplier defined by the special functionality may not be applied to a payout if the player wins the game event in which the game element is utilized) if the player who uses the selected game element in the qualifying action is not a qualifying player (e.g., is not a rated player). In some embodiments, the players at the table on which the selected game element is utilized may not event be informed that a selected game element has been detected at the table if the selected game element is not used in a qualifying action and/or is not used by a qualifying player. In other embodiments, the players and/or dealer may be informed that a selected game element has been detected and also may be informed why the special functionality of the selected game element was not applied to the game event. In embodiments in which a qualifying action needs to be performed, or a qualifying condition needs to be satisfied, prior to a special functionality being applied to a game event or transaction (or prior to a special functionality being associated with a game element), process 700 may include determining whether the qualifying action has occurred or a qualifying condition has been satisfied.

In step 760, the status of the game element is updated once the special functionality has been applied. For example, in one embodiment once the special functionality of a selected game element (e.g., a selected wagering chip) has been applied to a given transaction or game event, the selected game element may no longer be considered a selected game element that is associated with the special functionality (e.g., its status in a database may be changed or it may be removed from a database of selected game elements). Similarly, in some embodiments the special functionality of a game element may only be applied a maximum number of times before the special functionality is no longer associated with the selected game element. In such embodiments, a count of the number of times the special functionality has been applied may be updated. If the count has reached the maximum number, the special functionality may no longer be associated with the game element. In some embodiments, the status of the game element may be updated by updating data in a memory of the game element. In other embodiments, updating the status of the game element may comprise updating the status in a database, table or other memory scheme stored in a computing device distinct from the game element (e.g., a table in a memory of a server device (e.g., a memory of table game server 110 of FIG. 1) or an electronic table (e.g., a memory of a table system 120 of FIG. 1)). In one particular example embodiment, the status stored in table 600 (FIG. 6) as associated with the unique identifier of the game element may be updated.

Rules of Interpretation & General Definitions

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. For example, rather than designating a specific RFID-enabled chip as a selected chip as corresponding to special functionality for purposes of a bonus or promotion, one or more particular player positions of participating tables may be designated as selected player positions corresponding to special functionality. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, Local Area Network (LAN), Wide Area Network (WAN), or Ethernet (or IEEE 802.3), Token Ring, or via any appropriate communications means or combination of communications means. Exemplary protocols include but are not limited to: BLUETOOTH™, TDMA, CDMA, GSM, EDGE, GPRS, WCDMA, AMPS, D-AMPS, IEEE 802.11 (WI-FI), IEEE 802.3, SAP, SAS™ by IGT, SUPERSAS™, OASIS™ by Aristocrat Technologies, SDS by Bally Gaming and Systems, ATP, TCP/IP, gaming device standard (GDS) published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cellular networks, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

What is claimed is:

1. A method for facilitating special functionality of game elements during a card game, the method comprising:
   receiving data defining at least one physical game element detected as being in use for a card game, the least one physical game element being one of a plurality of such physical game elements usable by players for play of the card game, each physical game element of the plurality of physical game elements having a primary functionality associated therewith;
   determining, based on the data and during the card game, that special functionality is associated with the physical game element, the special functionality being distinct from the primary functionality associated with the at least one physical game element and entitling a player associated with the physical game element to a benefit the player would not otherwise be entitled to during the card game, the special functionality having been associated with a subset but not all of the plurality of physical game elements at a time prior to determining that the special functionality is associated with the physical game element, such that the association of the special functionality with the physical game element is concealed from a user of the physical game element until the physical game element has been utilized in a qualifying action;
   outputting, upon determining that the physical game element has been utilized in a qualifying action during the card game, an indication of the special functionality to the user of the physical game element;
   applying the special functionality to an event associated with the card game; and
   updating, in an electronic memory, a status of the physical game element, wherein the status is indicative of whether the special functionality continues to be associated with the physical game element after the applying.

2. The method of claim 1, wherein the physical game element is one of a playing card and a wagering chip.

3. The method of claim 1, wherein the physical game element comprises an RFID-enabled game element and wherein the step of receiving data comprises:
   receiving the data using an RFID interrogator of a card table on which the RFID-enabled game element is being used.

4. The method of claim 1, wherein the physical game element comprises a game element having an optically readable code located on a surface thereof and wherein the step of receiving data comprises:
   receiving the data based on a reading of the optically readable code by an optical image reader of a card table on which the physical game element is being used.

5. The method of claim 1, wherein the data comprises a unique identifier that uniquely identifies the physical game element.

6. The method of claim 1, wherein the data comprises information comprising at least one characteristic of the physical game element.

7. The method of claim 1, wherein determining, based on the data, that special functionality is associated with the physical game element comprises:
   looking up in a table, based on the data, whether the physical game element is associated with the special functionality, wherein the physical game element had been selected for association with the special functionality prior to a current card game being initiated if the table indicates that the physical game element is associated with the special functionality.

8. The method of claim 1, further comprising:
   determining which special functionality out of a plurality of special functionalities is to be applied to the event.

9. The method of claim 1, wherein the electronic memory comprises an electronic memory of at least one of the physical game element, an electronic table and a server device.

10. The method of claim 1, further comprising:
    determining that utilizing the physical game element in a qualifying action is a pre-condition to applying the special functionality; and
    verifying, prior to the applying, that the pre-condition has been satisfied.

11. The method of claim 1, further comprising:
    receiving, from a server device, data defining a plurality of physical game elements that have been selected by the server device for association with the special functionality; and
    wherein the step of determining comprises determining that the detected physical game element is included in the data defining the plurality of physical game elements.

12. The method of claim 1, wherein applying comprises: applying a multiplier to a payout won as a result of use of the physical game element.

13. The method of claim 1, wherein applying the special functionality comprises modifying at least one of a card value, a wager value, a wagering chip value and a card game rule, as any of the foregoing may be used to determine a game result for the player.

14. The method of claim 1, wherein the card game is a current card game and further wherein the event to which the special functionality is applied is an event during a subsequent card game played by the player after the current game.

15. The method of claim 1, wherein the event to which the special functionality is applied is an event external to the game.

16. A method for facilitating special functionality of game elements during a card game, the method comprising:
receiving data defining at least one physical game element detected as being in use for a card game, the least one physical game element being one of a plurality of such physical game elements usable by players for play of the card game, each physical game element of the plurality of physical game elements having a primary functionality associated therewith;
determining, based on the data, that special functionality is associated with the physical game element, the special functionality being distinct from the primary functionality associated with the at least one physical game element and entitling a player associated with the physical game element to a benefit the player would not otherwise be entitled to during the card game, the special functionality having been associated with a subset but not all of the plurality of physical game elements and wherein the association of the special functionality with the physical game element is concealed from a user of the physical game element until the physical game element has been utilized in a qualifying action,
wherein the special functionality is determined by:
(i) applying an algorithm to the physical game element during the card game to determine an outcome; and
(ii) determining based on the outcome that the physical game element is to have special functionality associated with it;
outputting, upon determining that the physical game element has been utilized in a qualifying action during the card game, an indication of the special functionality to the user of the physical game element;
applying the special functionality to an event associated with the card game; and
updating, in an electronic memory, a status of the physical game element, wherein the status is indicative of whether the special functionality continues to be associated with the physical game element after the applying.

17. The method of claim 16, wherein the outcome is determined based at least partly on information associated with at least one of the player, a game session at an electronic table on which the card game is being played and a gaming establishment at which the game is being played.

18. The method of claim 16, wherein the algorithm selects a game element on a pseudo-random basis.

19. A method for facilitating special functionality of game elements during a card game, the method comprising:
receiving data defining at least one physical game element detected as being in use for a card game, the least one physical game element being one of a plurality of such physical game elements usable by players for play of the card game, each physical game element of the plurality of physical game elements having a primary functionality associated therewith;
determining, based on the data, that special functionality is associated with the physical game element, the special functionality being distinct from the primary functionality associated with the at least one physical game element and entitling a player associated with the physical game element to a benefit the player would not otherwise be entitled to during the card game, the special functionality having been associated with a subset but not all of the plurality of physical game elements and wherein the association of the special functionality with the physical game element is concealed from a user of the physical game element until the physical game element has been utilized in a qualifying action;
outputting to the user, upon determining that the physical game element has been utilized in a qualifying action during the card game and via a display device of an electronic table on which the card game is being played and after the card game is initiated, an indication that at least one physical game element being used in the card game is associated with special functionality;
applying the special functionality to an event associated with the card game; and
updating, in an electronic memory, a status of the physical game element, wherein the status is indicative of whether the special functionality continues to be associated with the physical game element after the applying.

20. The method of claim 19, wherein the indication further defines the special functionality associated with the physical game element.

21. The method of claim 19, wherein the indication includes an identification of at least one of the physical game element, the player associated with the physical game element and a player position associated with the physical game element.

22. A method for facilitating special functionality of game elements during a card game, the method comprising:
receiving data defining at least one physical game element detected as being in use for a card game, the least one physical game element being one of a plurality of such physical game elements usable by players for play of the card game, each physical game element of the plurality of physical game elements having a primary functionality associated therewith;
determining, based on the data, that special functionality is associated with the physical game element, the special functionality being distinct from the primary functionality associated with the at least one physical game element and entitling a player associated with the physical game element to a benefit the player would not otherwise be entitled to during the card game, the special functionality having been associated with a subset but not all of the plurality of physical game elements and wherein the association of the special functionality with the physical game element is concealed from a user of the physical game element until the physical game element has been utilized in a qualifying action;
outputting, upon determining that the physical game element has been utilized in a qualifying action during the card game, an indication of the special functionality to the user of the physical game element;

applying the special functionality to an event associated with the card game by performing at least one of modifying data in a paytable and selecting an alternate paytable for use in determining a game result for the player associated with the physical game element; and updating, in an electronic memory, a status of the physical game element, wherein the status is indicative of whether the special functionality continues to be associated with the physical game element after the applying.

* * * * *